United States Patent [19]
Argyle et al.

[11] Patent Number: 5,331,728
[45] Date of Patent: Jul. 26, 1994

[54] METHOD OF FABRICATING MAGNETIC THIN FILM STRUCTURES WITH EDGE CLOSURE LAYERS

[75] Inventors: Bernell E. Argyle, Putnam Valley, N.Y.; Thomas C. Arnoldussen, Los Altos; Thomas J. Beaulieu, Hollister, both of Calif.; Dean A. Herman, Jr., Garrison; Sol Krongelb, Katonah, both of N.Y.; Hin P. E. Lee, San Jose; Daniel A. Nepela, Saratoga, both of Calif.; Bojan Petek, Croton-on-Hudson, N.Y.; Lubomyr T. Romankiw, Briarcliff Manor, N.Y.; John C. Slonczewski, Katonah, N.Y.

[73] Assignee: International Business Machines Corporation, Armonk, N.Y.

[21] Appl. No.: 686,782

[22] Filed: May 13, 1991

Related U.S. Application Data

[62] Division of Ser. No. 432,649, Nov. 7, 1989, Pat. No. 5,032,945.

[51] Int. Cl.$^5$ .............................. G11B 5/42
[52] U.S. Cl. .................... 29/603; 360/126; 427/131
[58] Field of Search ............... 29/603, 609; 360/119–121, 125, 126, 128; 427/131; 336/234

[56] References Cited

U.S. PATENT DOCUMENTS

| | | | |
|---|---|---|---|
| 3,350,180 | 10/1967 | Croll | 427/131 X |
| 4,103,315 | 7/1978 | Hempstead et al. | |
| 4,320,427 | 3/1982 | Bogan | 29/603 X |
| 4,751,598 | 6/1988 | Hamilton | |
| 4,907,113 | 3/1990 | Mallary et al. | |

FOREIGN PATENT DOCUMENTS

| | | |
|---|---|---|
| 5961114 | 9/1982 | Japan |
| 59-60721 | 4/1984 | Japan |
| 60-258717 | 12/1985 | Japan |
| 62-052710 | 8/1987 | Japan |
| 64-064108 | 6/1989 | Japan |
| 89005505 | 6/1989 | World Int. Prop. O. |

OTHER PUBLICATIONS

Slonczewski et al., "Micromagnetics of Laminated Permalloy Films", *IEEE Transactions on Magnetics*, vol. 24, No. 3, May 1988.

(List continued on next page.)

*Primary Examiner*—Carl E. Hall
*Attorney, Agent, or Firm*—Scully, Scott, Murphy & Presser

[57] ABSTRACT

Magnetic thin film structures including a laminate of a layer of nonmagnetic material sandwiched between first and second layers of magnetic material and at least one edge closure layer of magnetic material disposed on a side edge of the laminate with the edge closure layer being in magnetic contact with the first and second layers of magnetic material. The edge closure layer eliminates magnetic edge closure domains and magnetic edge-curling walls in the yoke and poletip regions, or in a fluxguide of a magnetic recording head to substantially eliminate Barkhausen noise and wall network instabilities. Multiple layer laminates are also disclosed having a plurality of nonmagnetic layers each of which are sandwiched between layers of magnetic material and wherein the laminate includes edge closure layers that contact all the magnetic layers. Several methods are disclosed for fabricating the laminate. In one class of technique, the side edges are deposited together with a top layer in a single plating operation. In an another embodiment, the side edge closure layers are separately plated. Another embodiment provides for a layer of antiferromagnetic material deposited between the nonmagnetic layer and one of the magnetic layers to provide additional anisotropy.

38 Claims, 17 Drawing Sheets

U.S. PATENT DOCUMENTS

Herman, Jr. et al., "Study of Field-Driven Wall-Configuration Conversions for Laminated Permalloy in the Easy-Axis State," *J. Appl. Phys.* 63(8), Apr. 15, 1988.

Herman, Jr. et al., "Edge-Curling-Wall Discontinuities and Interactions with Bloch Walls in Easy-Axis Permalloy" *IEEE*, vol. 24, No. 6, Nov. 1988.

Tsang et al., "Magnetics of Nonlaminated, Bilaminated, and Multilaminated Permalloy Stripes", *J. Appl. Phys.* 63(8), Apr. 15, 1988.

Romankiw, L. T. et al., Ext. Abs. *Electro. Chem. Soc.* vol. 89, Abs#300, pp. 430–431, Fall 1989.

Tsang et al., "Exchange Induced Unidirectional Anisotrophy at $FeMnNi_{80}Fe_{20}$ Interfaces", *J. Appl. Phys.* 52(3), Mar. 1981.

Feng et al., "Permeability of Narrow Permalloy Stripes", *IEEE*, vol. MAG-13 No. 5, Sep. 1977.

Naksura et al., "Analysis of Domain Structure of Single Pole Perpendicular Head", *IEEE*, vol. MAG-21, No. 5, Sep. 1985.

Thompson et al., Laminated Films With Alternately Skewed Easy Axis for Magnetic Transducers, IBM Technical Disclosure Bulletin, vol. 19, No. 8, Jan. 1977.

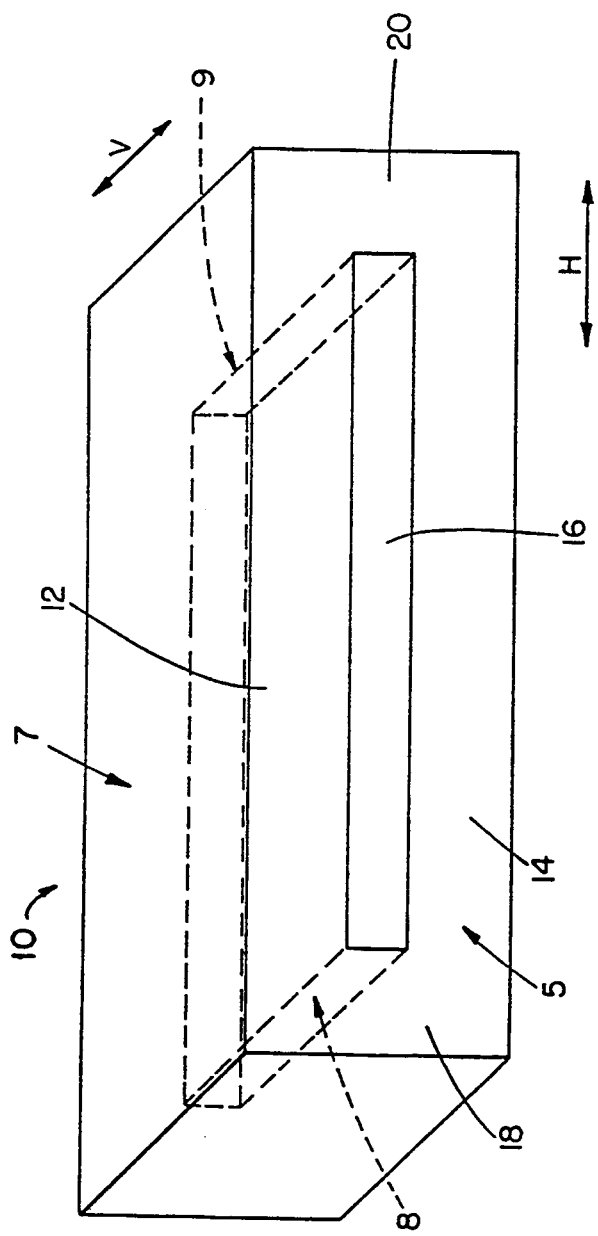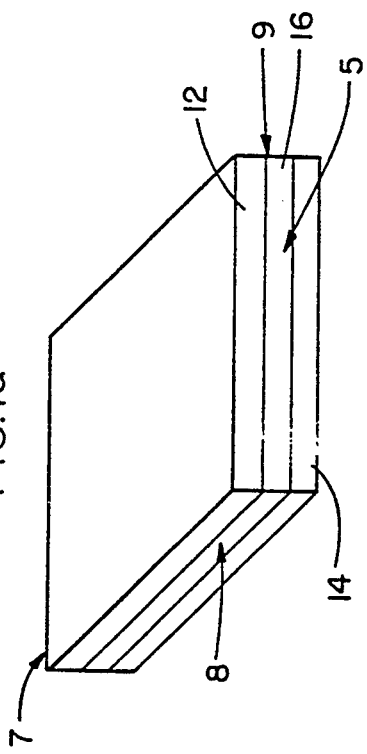

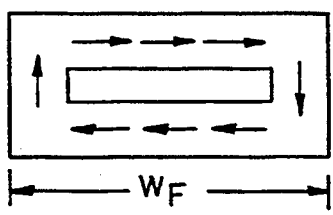
FIG.5b EASY AXIS, NO LEAK.
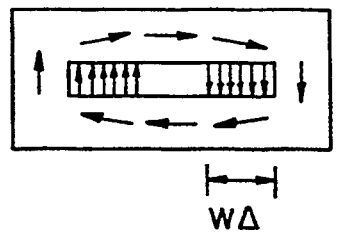
FIG.5c EASY AXIS, PARTIAL LEAK.
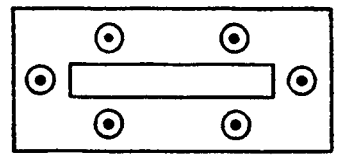
FIG.5d HARD AXIS.
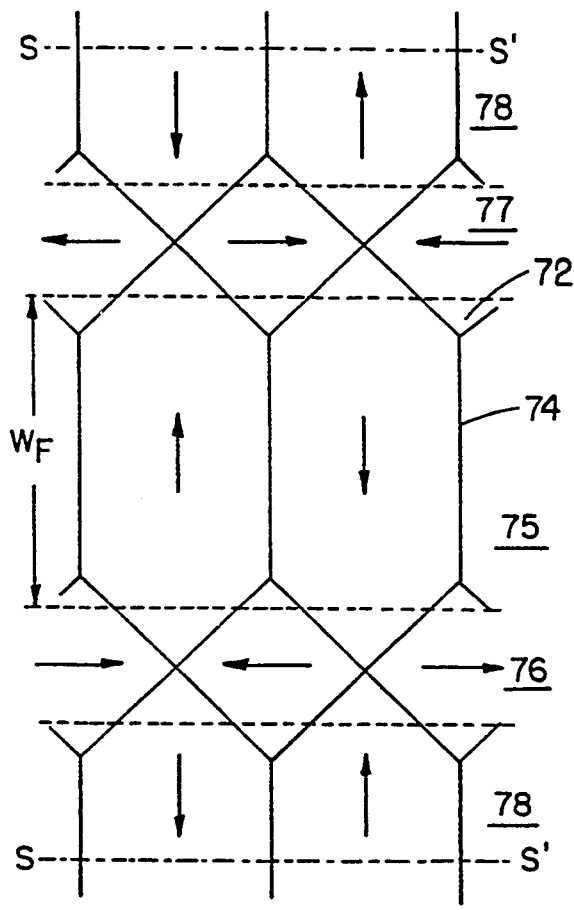
FIG.5e CLOSURE DOMAINS.

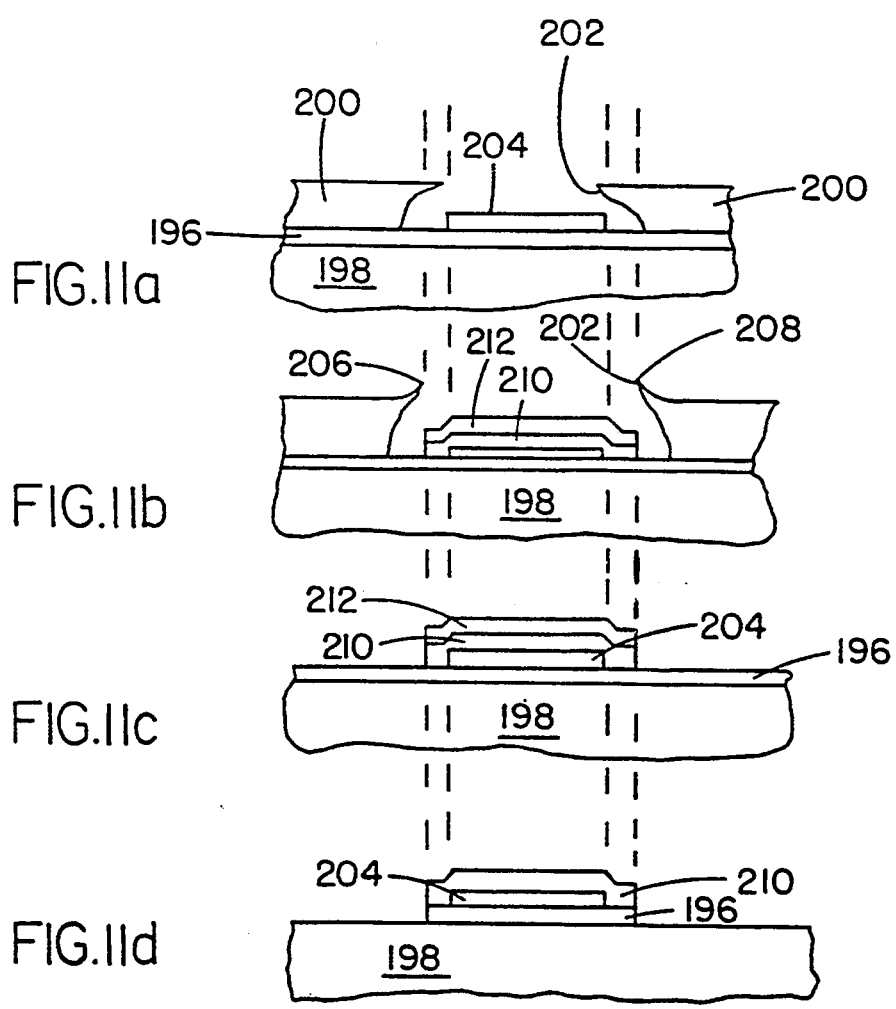

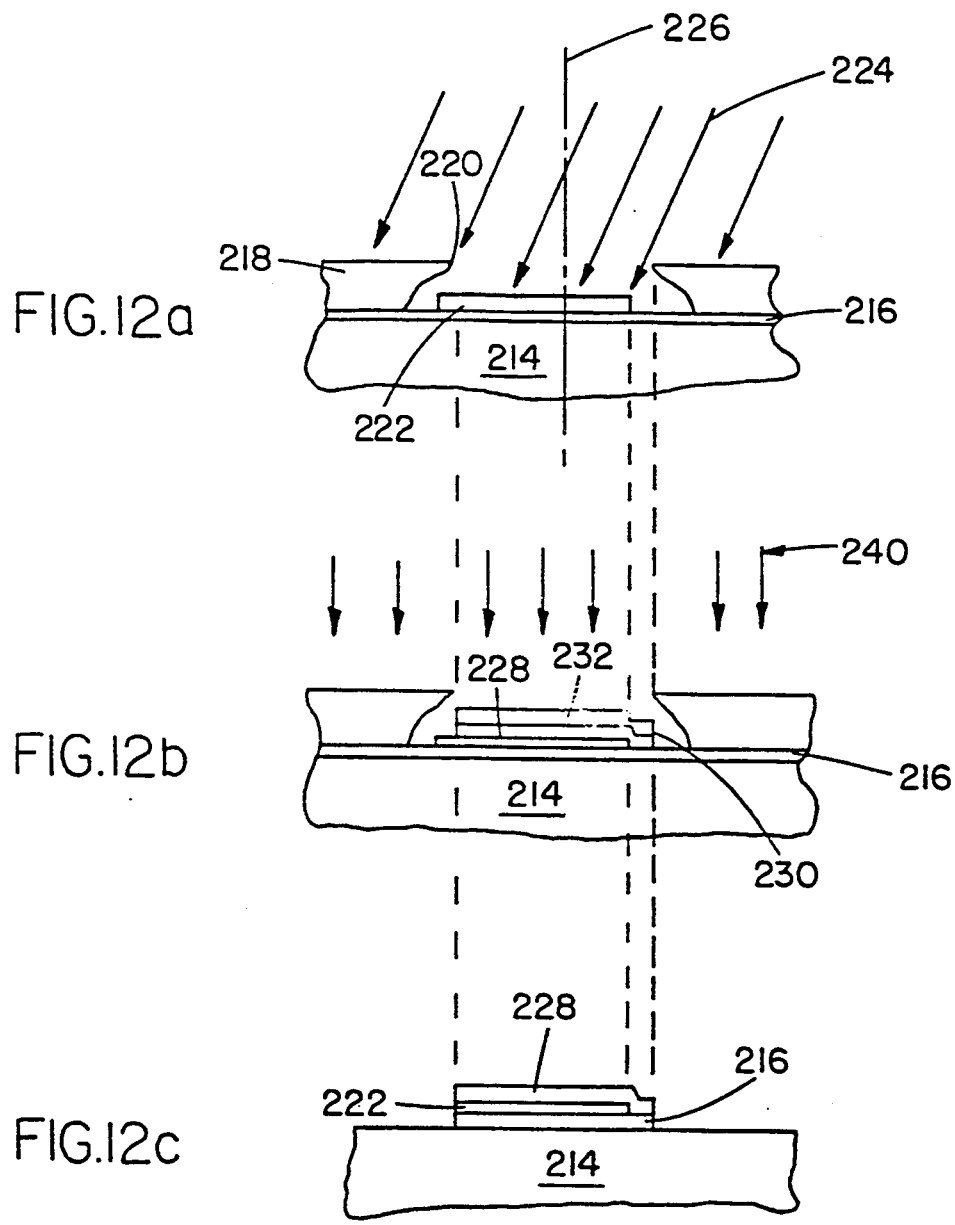

METHOD OF FABRICATING MAGNETIC THIN FILM STRUCTURES WITH EDGE CLOSURE LAYERS

This is a divisional of copending application Ser. No. 432,649, filed on Nov. 7, 1989, now U.S. Pat. No. 5,032,945.

BACKGROUND OF THE INVENTION

1. Field of the Invention

This invention relates to thin film structures for magnetic recording heads and more particularly, to laminated thin film structures and methods for forming such structures.

2. Description of the Prior Art

In conventional thin film inductive recording heads, the soft magnetic films (e.g., NiFe) are deposited using a process which causes the magnetic easy axis to be parallel to the plane of the recording medium. This usually results in triangular magnetic domains formed along left and right edges of the soft film which are called closure domains. The closure domains form in order to minimize the total magnetic energy associated with the film and its surrounding space. Such closure domains lower the total energy despite the fact that the magnetization is directed completely or partially in the hard magnetic axis direction.

When the head is driven by a current loop, or when the head is sensing a magnetic field from the recording medium, the net magnetic induction in the soft film of the head increases in the vertical direction by rotation of the magnetization vector in the central domains, along with alternate growth and shrinkage of closure domains. By convention, a recording head is regarded as lying in a vertical plane above a horizontal recording medium so that the vertical direction is axial to the pole tips and normal to the medium. The presence of the side closure domains causes wall motion to accompany magnetization rotation, thereby limiting permeability and head efficiency. In addition, noise can be created whenever defects interact with the walls or conversion of the domain structure to a new pattern occurs.

When the throat or poletip region of an inductive head, or the flux guide for a magnetoresistive head, is made narrow horizontally, to achieve a narrow recording trackwidth, the closure domains become more significant. In this case, when the head is driven by a current loop or senses an external field, magnetization in the vertical direction increases mainly by horizontal motion of the vertical wall in the center of the poletip. While the mobility of this wall may be sufficient to give adequate head efficiency, large displacements of such a wall may cause the wall to encounter a wall pinning defect, leaving the head domain configuration in a mestastable state. This can result in changes of reading efficiency during operation and wall-motion (Barkhausen) noise for narrow track heads or for perpendicular recording "probe" heads whose throat height to throat width ratio favors vertical wall formation.

To make a high efficiency, low noise, narrow track head, it is desirable to force the magnetization into the horizontal easy axis direction, and to eliminate the side closure domains. One prior art technique for partially accomplishing this is to laminate the soft magnetic films used for the yoke of the head. Instead of depositing one layer, a plurality of magnetic layers are deposited with each pair of magnetic layers being separated by a thin nonmagnetic spacer layer. Each magnetic sublayer may then have its magnetization lie in the easy axis direction, but neighboring layers have their magnetization directed horizontally antiparallel. Flux closure between the layers is through the spacer near the edges and via external fringe fields at the side edges.

Slonczewski, et al., "Micromagnetics of Laminated Permalloy Films", IEEE Trans. on Mag., Vol. 24, No. 3, p. 2045, May 1988, show that in laminated films of the proper dimensions, closure domains are replaced by edge-curling walls. The interior of the film has a magnetization aligned in the easy axis direction which is optimum for transmitting flux by magnetization rotation. However, Herman, et al., "Study of Field-Driven Wall-Configuration Conversions for Laminated Permalloy in the Easy-Axis State", J. Appl. Physics, Vol. 63, No. 8, p. 4036, April 1988, and "Edge-Curling-Wall Discontinuities and Interactions with Bloch Walls in Easy-Axis Permalloy", IEEE Trans. on Mag., Vol. 24, No. 6, p. 3066, November 1988, showed that though a single domain (no wall) state can occur in a laminated film recording head yoke, the most stable state is found to have a single wall in each magnetic layer. This wall can be a source of instability and noise. In addition, the edge-curling walls reduce the active cross-section of the film and can also be a source of noise. Reducing the width of the edge-curling walls demands multiple thin laminations with very thin nonmagnetic spacers which require additional, carefully controlled fabrication steps. Moreover, in addition to extra expense, multiple thin laminations are potentially subject to problems such as spacer pinholes and higher coercivity. C. Tsang, et al., "Magnetics of Nonlaminated, Bilaminated, and Multilaminated Permalloy Stripes", J. Appl. Physics, Vol. 63, No. 8, p. 2938, April 1988 have shown that magneto-resistance measurements of narrow, multiple laminated films show noise and instabilities due to additional complex domain states. Thus, while a simple lamination is adequate to eliminate most noisy domain walls from a wide, about 100 um, yoke of the head, it is very difficult to fabricate narrow, less than 10 um, poletip regions of flux guides with the necessary multiple thin laminations.

In another approach, disclosed in U.S. Pat. No. 4,103,315, the domain walls are minimized by a multiple thin film structure including at least one pair of layers of a ferromagnetic material and an antiferromagnetic material deposited one upon one another, that are exchange coupled to retain a unidirectional bias in the plane of the ferromagnetic material. If multiple pairs of layers are used, a layer of nonmagnetic material is provided to separate the pairs. The successive pairs of layers have their unidirectional bias pointing in opposite directions. However, if the bias is strong, rotational permeability and head efficiency are reduced. If the bias is weak, domain walls are not completely eliminated and the films exhibit Barkhausen noise.

SUMMARY OF THE INVENTION

The present invention is directed to a magnetic thin film structure comprising a laminate of a spacer layer of nonmagnetic material sandwiched between first and second layers of magnetic material and at least one edge closure layer of magnetic material disposed on at least one side edge of the laminate. The edge closure layer is in magnetic contact with each of the layers of magnetic material. The edge closure layer acts as a magnetic short between the magnetic layers that results in the elimination of both edge-curling walls and closure domains on the side or sides that have been edge closed. In the preferred embodiment, two opposed side edges of the laminate have edge closure layers so that the magnetization of the magnetic layers will circulate from one magnetic layer to the other, in the easy-axis direction (easy-axis behavior), forming a closed loop of magnetic material.

The edge-closed laminate of the invention may be used to manufacture such structures as the yoke and poletip of an inductive recording head and the flux guide of a magnetoresistive head. The heads are typically inductive read/write or magnetoresistive read/inductive write. With both edges closed, the laminate of the present invention provides a magnetic recording head or fluxguide having the easy axis direction horizontal and no closure domains or edge-curling walls. With only one edge closed, closure domains or edge curling walls remain on the open edge. Such single-edge-closed structures are more stable than single films or laminates without edge-closure and, therefore, would also be useful in magnetic recording head applications.

The structures fabricated with the magnetic-nonmagnetic laminate and edge closure layer in accordance with the invention can be manufactured with a single comparatively thick nonmagnetic spacer layer. The comparatively greater thickness of the single spacer is easier to fabricate with sufficient continuity to prevent deleterious contact of the magnetic films through pin holes. Thus, the need to form a poletip with numerous very thin, continuous layers, in order to achieve easy-axis behavior, is eliminated. Proper choice of dimensions can eliminate both edge closure domains and edge-curling walls allowing the entire width of the yoke, poletip and/or fluxguide to transmit flux by pure magnetization rotation. Triangular closure domains found in the non-laminated films are eliminated. Edge curling wall switching noise and wall motion (Barkhausen) noise are eliminated or reduced to insignificant values.

The magnetic states of the thin film structures formed in accordance with the invention are inherently stable. In addition, process manufacturing tolerances will be greatly relaxed. The easy-axis state of edge-closed lamination is very robust. Even if the relaxed tolerances, compared with simple (non edge-closed) lamination, are violated, e.g. by too thin edge closures or spacers, the resulting magnetic states combine areas of easy-axis material with vestigial edge-closure domains or partial edge-curling respectively. If the structure is not too far out of tolerance, these combination states still provide considerable improvements over the magnetic states of single layers or simple laminations.

In another embodiment of the invention, a layer of antiferromagnetic material is interposed between one of the magnetic layers and the spacer in the laminate, but is out of contact with the other magnetic layer adjacent the spacer. The antiferromagnetic layer exchange biases the contacted ferromagnetic layer in a horizontal direction. The introduction of the antiferromagnetic layer provides additional anisotropy to the structure.

Preferably, the upper and lower edges of the laminate (the edges parallel to the recording medium during the recording and reading operations) of the recording head will not have edge closure layers. The edge closure layers will therefore be provided on the two side edges normal to the recording medium. In the embodiment having the antiferromagnetic layer it is often preferred that the antiferromagnetic material does not extend all the way to the edge of the laminate facing the recording medium, also known as the air bearing surface.

The magnetic thin film structures of the invention may be fabricated with a single nonmagnetic layer and two magnetic layers, or with a plurality of the laminates stacked one on top of the other. Multi-laminated edge-closed structures are useful in applications where high frequencies are required and response is limited by eddy currents. To accomplish proper flux closure via the edge-closure layers, such a laminate can have an even number of identical magnetic layers with edge-closure layers of the same material and thickness. Alternatively, some of the magnetic layers (including the edge-closure layers) may be different magnetic materials, with thicknesses selected to carry the same magnetic flux in saturation. Finally, numbering from the top (or bottom) of the laminate, the even numbered nonmagnetic spacer can be eliminated, making the interior magnetic layers twice as thick as the outer and edge-closure layers.

Several methods for fabricating the laminates of the present invention are disclosed. In one method, the plate-up approach commonly used in the fabrication of thin film heads is adapted to produce the edge closed laminates of the invention. As is conventional, a seed layer of magnetic material is deposited over a substrate and a thin dielectric layer is deposited on the seed layer. A photoresist plating frame is formed photolithographically on the dielectric layer, and the exposed dielectric layer is chemically etched. The laminate is then deposited by alternately plating out of the same bath, or separate baths, the magnetic layers and nonmagnetic spacers. After the last spacer is plated, the frame is removed and the final magnetic layer is deposited. Since the frame is no longer in place, plating also occurs on the edges of the structure, but the dielectric layer that was under the frame prevents plating on the seed layer. The unwanted material on either side of the laminate is then removed by conventional techniques to leave behind the edge-closed structure. In a variation of this method, the initial plating of the laminated films is stopped after the top layer of magnetic material has been deposited. The plating frame is removed and additional magnetic material is plated on the top and side edges resulting in a double thickness layer on the top. The thickness of the top layer is reduced to the thickness of the other magnetic layers during etching of the unwanted material from the substrate.

In another method, the laminate of magnetic layers and spacers is deposited on the substrate and is trimmed to the desired width by conventional techniques such as ion milling. The side edges of the laminate are activated by immersion in a standard palladium chloride activating solution. Subsequently, the laminate is immersed in a standard electroless bath to deposit a magnetic material on the side edges.

In yet another method, a resist lift off technique is utilized to form the edge-closed laminate. After the first layer of magnetic material is deposited on the substrate, a photoresist is deposited having a window defining the width of the nonmagnetic spacer. The nonmagnetic material is then deposited through the window. Subsequently, the resist is heated to shrink back and thereby widen the window. A second layer of magnetic material is deposited through the window which covers the side edges of the nonmagnetic material and contacts the first layer to provide the edge-closed laminate. A masking layer of a refractory metal is also deposited through the widened resist window to protect the laminate during etching of the first magnetic layer. Lift-off and etching are then performed. Finally, the refractory metal masking layer is removed. Other variations on the lift-off process are disclosed, such as, the lifting off and depositing of a second resist instead of widening the window of the first resist. In addition, a single edge-closed laminate may be formed by depositing the nonmagnetic spacer layer on the substrate assembly with the assembly tilted so that the angle of deposition through the window results in only one edge being closed when the second magnetic layer is subsequently deposited at normal incidence.

To provide the exchange biased antiferromagnetic structure, the antiferromagnetic layer may be deposited in several ways. The first method would be to deposit the antiferromagnetic layer in the presence of an applied field. Alternatively, the antiferromagnetic layer may be deposited onto a previously oriented magnetic layer, or it may be deposited on a previously oriented magnetic layer while an orienting field is also being applied. In a further technique, all the magnetic and antiferromagnetic layers are deposited preferably in an applied orienting field, followed by a setting anneal for the structure of a temperature above or near the Neel temperature of the antiferromagnetic layer and cooling in the presence of an applied orienting field.

BRIEF DESCRIPTION OF THE DRAWINGS

FIG. 1a is a perspective view of a magnetic thin film structure of the present invention.

FIG. 1a' shows the structure of FIG. 1a prior to edge closure.

FIGS. 5b, 5c, 5d and 5e are schematic drawings of four micromagnetic states.

FIGS. 11a–11d are schematic diagrams of the sequence of steps of a fourth method of fabricating a magnetic thin film structure of the present invention.

FIGS. 12a–12c are schematic diagrams of the sequence of steps of a method of fabricating a single-edge closed embodiment of the magnetic thin film structure of the present invention.

DETAILED DESCRIPTION OF THE PRESENT INVENTION

Figure 1B:
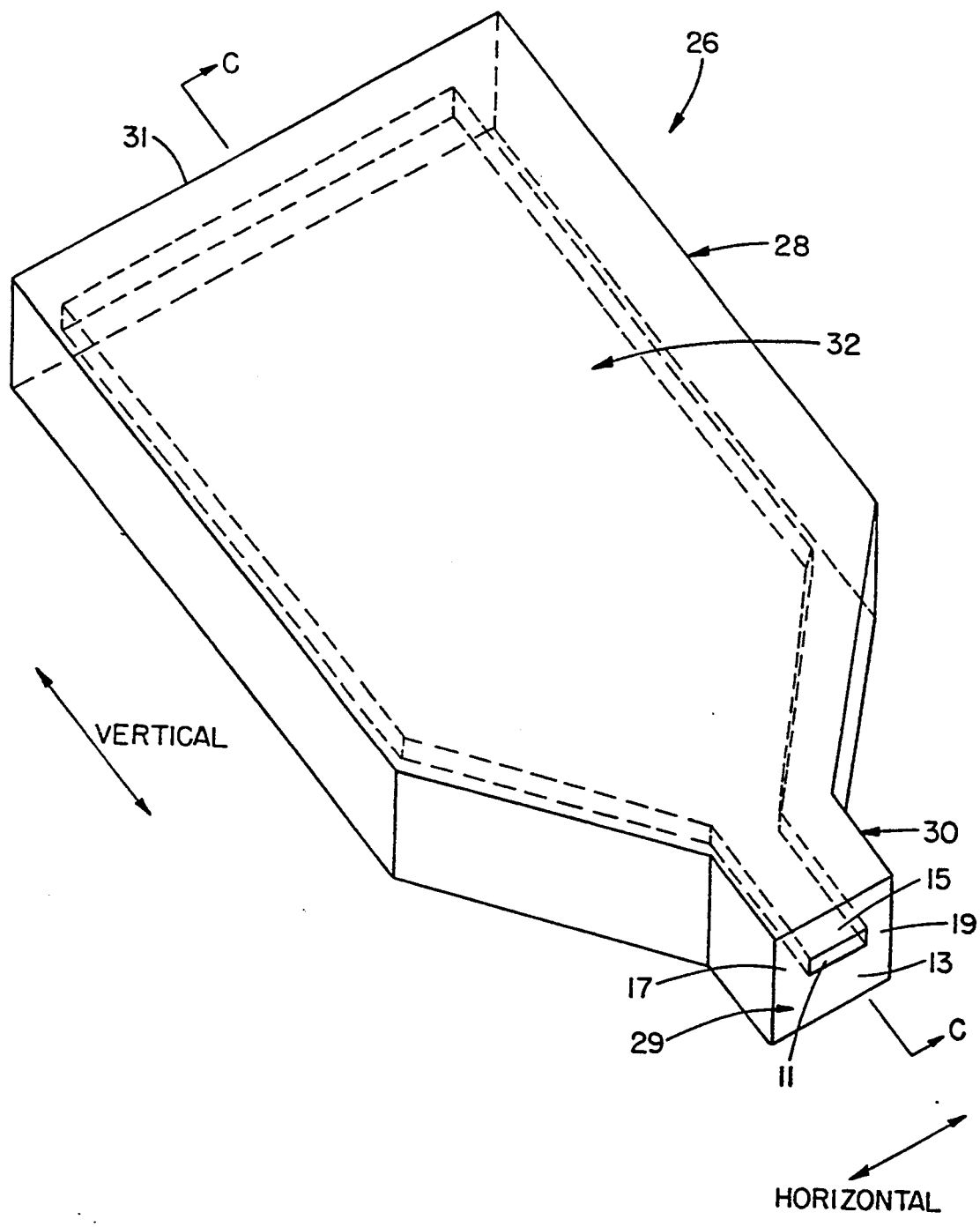
FIGS. 1b and 1c show a typical shape of a yoke and poletip of an inductive thin-film head having the structure of the present invention.

FIGS. 1a and 1a' show a thin film magnetic structure 10 comprising a laminate of layers 12 and 14 of magnetic material and spacer layer 16 of non-magnetic material disposed between magnetic layers 12 and 14. FIG. 1a' shows that the laminate before edge closure has opposed vertical side edges 8 and 9 and opposed horizontal side edges 5 and 7. The direction, being shown throughout the Figures by arrows marked V for vertical and H for horizontal, is with respect to the manner in which the recording heads are conventionally operated. As shown in FIG. 1a, the laminate 10 after edge closure further includes edge-closure layers 18 and 20 of magnetic material that are in magnetic contact with layers 12 and 14. In the preferred embodiment of the invention, opposed side edges 8 and 9 of the structure 10 are edge-closed as shown. It should be understood that the present invention includes a single side edge-closed laminate. For example, laminate 10 may include edge-closure layer 18 and not layer 20 so that side edge 9 of the laminate 10 would be open. Moreover, in the preferred embodiment, horizontal side edges 5 and 7 of laminate 10 would be open, although, one or both may be closed.

The closed-edge laminate 10 may be used in the manufacture of various magnetic recording heads, including inductive and magnetoresistive heads. FIG. 1b shows a portion of an inductive magnetic recording head 26 that can be used for writing and reading magnetic signals onto and from a magnetic recording medium. The portion of the recording head 26 shown includes a yoke portion 28 and a poletip portion 30.

The yoke 28 and poletip 30, are each formed, as shown in FIG. 1b, of a laminate of a spacer layer of nonmagnetic material 11 sandwiched between two layers of magnetic material 13, 15. The structure 26 includes edge closure layers 17 and 19 disposed on opposed side edges of yoke 28 and on opposed side edges of poletip 30. The edge-closure layers 17 and 19 are comprised of magnetic material and are in magnetic contact with magnetic layers 13 and 15 thereby providing a closed magnetic flux loop from layer 13 to layer 15. The air bearing surface 29 and the back edge 31 may be open or edge-closed; the preferred embodiment is open for both as shown. Each of the layers 11, 13, 15, 17 and 19 extend continuously from the air bearing surface 29 to the backedge 31. The air bearing surface 29 permits the recording head to lift from the media as a result of relative motion and yet remain in intimate association therewith for reading and writing the magnetic transitions requried for the storage of data information onto the magnetic media.

Figure 1C:
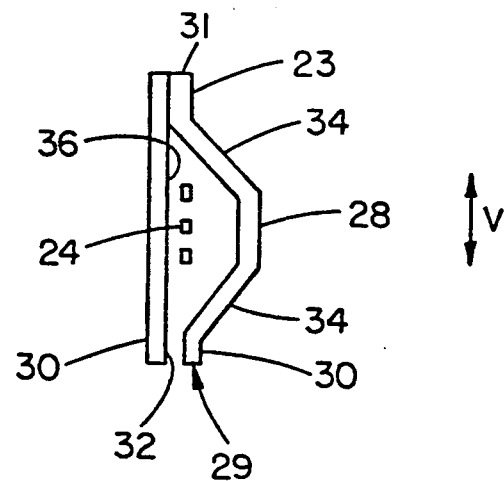

As is well known in the art, a magnetic recording head includes at least two poletips and yoke portions separated by a gap. As shown in FIG. 1c, the gap is located in the space 32 between the poletips 30. FIG. 1c shows a cross-section of a recording head having angled sections 34 that results in the gap 36 at the poletip being substantially smaller than the separation 36 for the coils 24 in the yoke. The gap 32 is filled with nonmagnetic material. In some realizations of magnetoresistive heads, the magnetoresistive element is placed in the gap.

Figure 1D:
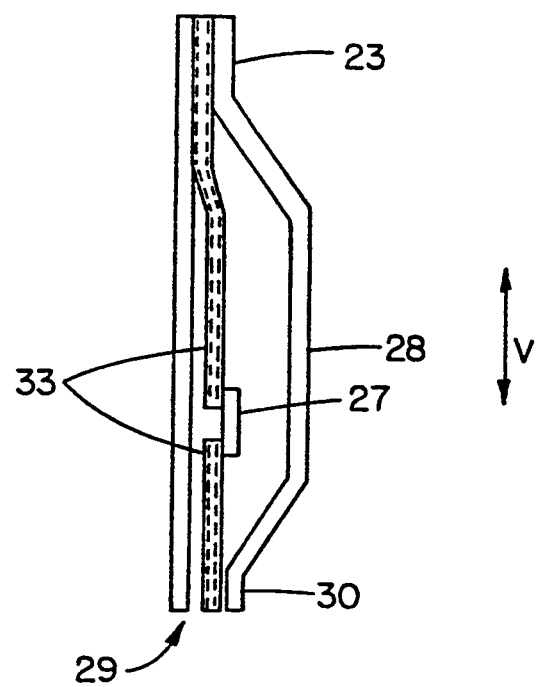
FIG. 1d is a cross-section of a MR head having a flux guide formed with the structure of the present invention.

In some magnetoresistive (MR) read head designs, the magnetoresistive element is removed from the air bearing surface and signal flux is brought to the element with a strip of magnetic material called a fluxguide. A fluxguide embodiment of the present invention would be a simple edge-closed strip such as the structure 10 of FIG. 1a. FIG. 1d is an example of an MR head 21 having a yoke region 28, poletip region 30 and back closure region 23. An MR element 27 is recessed from the air bearing surface 29; during reading, flux is brought to the MR element through a fluxguide 33 formed of the edge-closed laminate of FIG. 1a. The fluxguide 33 could have constant cross-section or be flared (in the same manner though not necessarily with the same dimensions) as the yoke of FIG. 1b.

Figure 1E:
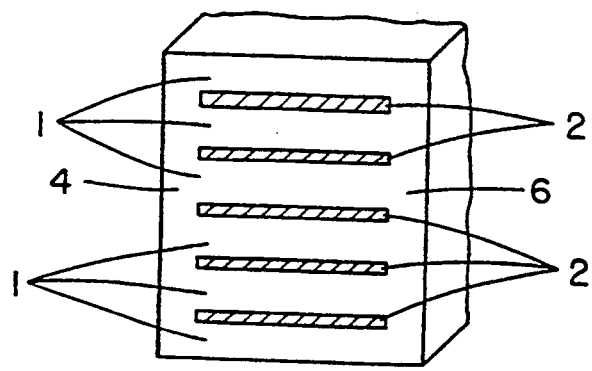
FIG. 1e is a perspective view of a multiple laminate embodiment of the present invention.
Figure 1F:
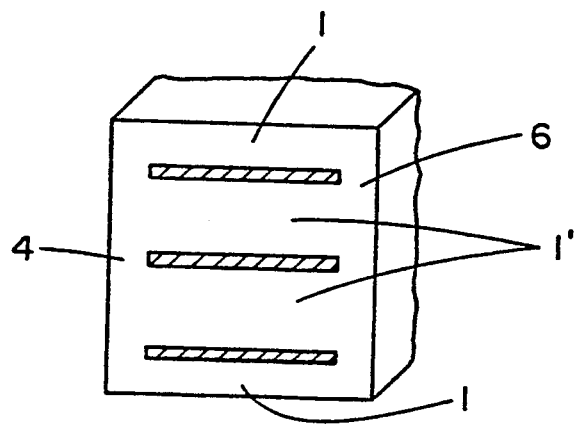
FIG. 1f is a perspective view of an alternative multiple laminate embodiment wherein the even numbered nonmagnetic spacers have been eliminated.

Multilaminated embodiments of the invention are depicted in FIGS. 1e and 1f. In FIG. 1e, each magnetic layer 1, separated by nonmagnetic spacers 2, and the edge-closure layers 4 and 6 are the same thickness. In FIG. 1f, an embodiment is shown in which the even numbered spacers of FIG. 1e are eliminated. In this case, the interior magnetic layers 1' are twice as thick as the outer magnetic layers 1 and the edge-closure layers 4 and 6.

The edge closure layers of the thin film laminate of the invention act as magnetic shorts between the laterally disposed magnetic layers and have the effect of eliminating the edge-curling walls seen in prior art laminated fluxguides, yokes and poletips and also eliminating edge closure domains found in prior art unlaminated fluxguides, yokes and poletips. As an aid in the understanding of the advancement of the present invention over the prior art, a comparison will be made of the magnetization patterns of prior art heads to the inventive recording head.

Figure 2A:
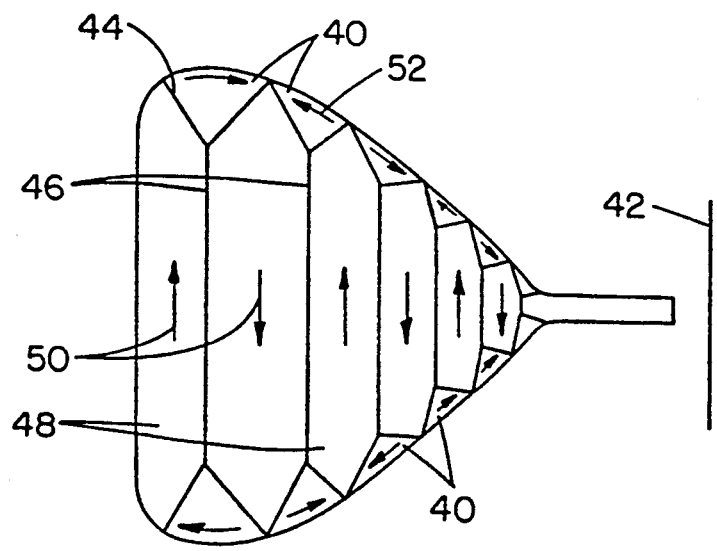
FIGS. 2a, 2b, 2c, 3a, 3b and 3c are planar schematic diagrams of the magnetization pattern of prior art magnetic recording heads.
Figure 2B:
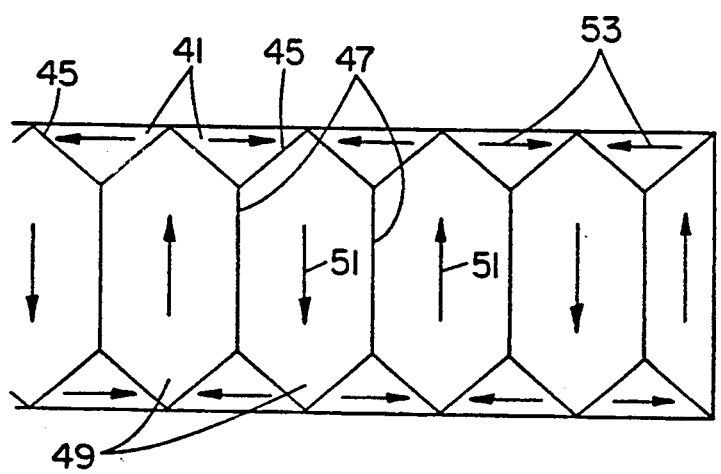
Figure 2C:
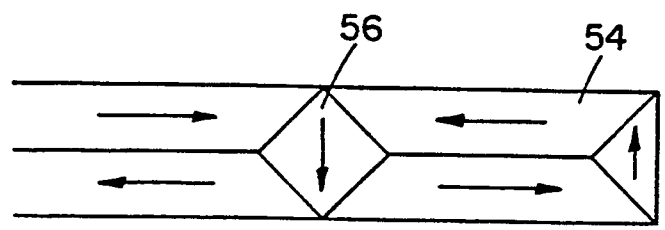

FIGS. 2a, 2b and 2c are planar schematic depictions of prior art non-laminated inductive recording head yokes (FIG. 2a) and poletip (FIGS. 2b and 2c) regions showing magnetic domain patterns. Triangular domains 40 (FIG. 2a) and 41 (FIG. 2b) formed along the side edges of the yoke and poletip are closure domains that form in order to minimize the total magnetic energy associated with the film in a surrounding space. The structure has a magnetic easy axis in the plane of the material and parallel to a recording medium 42. The domain walls 44 and 45 of the edge closure domains 40 and 41 are known as 90° domain walls. The structure further includes 180° domain walls 46 and 47 that define central domains 48 and 49. The arrows 50 and 51, and 52 and 53 represent the magnetic vectors for the central and edge-closure domains, respectively. FIG. 2c represents the case where the poletip width is too narrow (for the combination of magnetic anisotropy and film thicknesses used) to form full edge-closure domains 41 and 180° walls 47. As can be seen in FIG. 2c, in the extremely narrow poletip region, the edge closure domains 54 occupy a greater fraction of the film volume and the central domains 56 have a diamond shape.

Figure 3A:
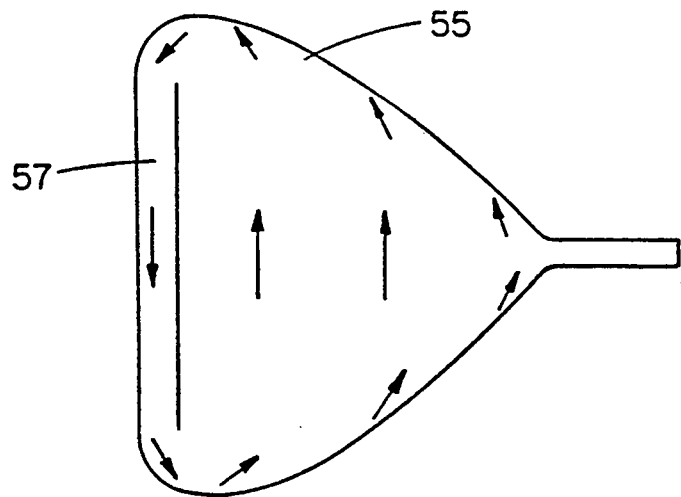
Figure 3B:
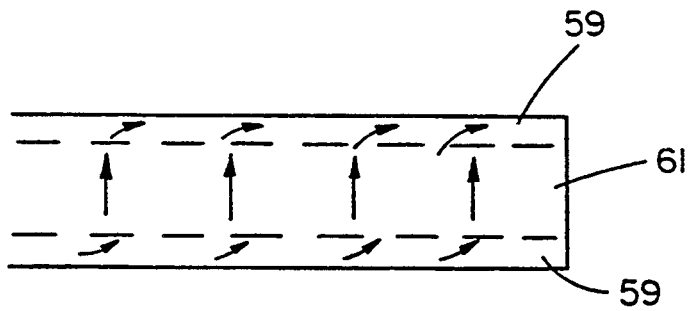
Figure 3C:
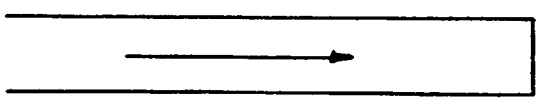
Figure 3D:
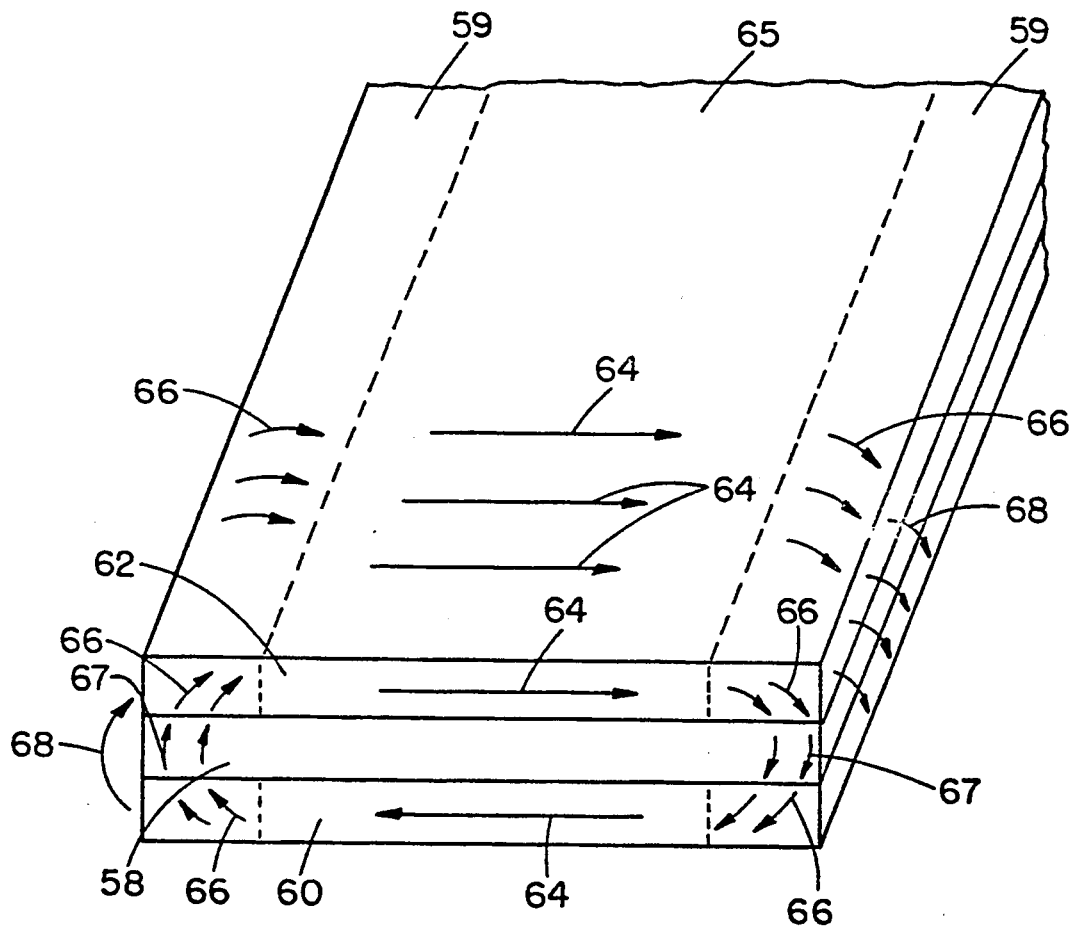
FIG. 3d is a perspective view of a prior art laminated thin film structure without edge closure.

Domain wall motion and configurational instability result in noise during the reading operation of the head. In order to reduce this noise, it was found that laminating the magnetic structure by alternating magnetic and nonmagnetic layers would result in eliminating the triangular edge closure domains as well as most of the domain walls forming the central domains. FIGS. 3a, 3b and 3c show the magnetization patterns of yoke and poletip regions of prior art laminated recording head structures. A perspective view of the laminated structure is shown in FIG. 3d, which includes a layer of nonmagnetic material 58 sandwiched between two layers of magnetic material 60 and 62. The magnetization of the central region 65 of each of the magnetic layers 60 and 62 is in the easy axis direction as represented by arrows 64, with the flux loop being closed through the spacer 58 near the edges (arrows 67) and external fringe fields (arrows 68). The regions 59 in which the magnetization M curls are called edge-curling walls. M curls both between films and parallel to the films as indicated by the arrows 66 representing the surface components of the magnetization.

As shown in FIG. 3a, the edge closure domains are eliminated and are replaced by edge-curling walls depicted by arrows 55 and only one 180° domain wall 57 remains in the yoke portion; this is the lowest energy state. The edge-curling walls result from the rotation (curling) of the magnetic vector both in-plane and from one magnetic layer through the spacer to a second magnetic layer. In FIG. 3b, the edge-curling walls 59 are adjacent to the upper and lower poletip edges. These regions are on the average only about half as effective in transmitting flux as the central, easy-axis, material 61. In the extreme case where the edge-curling walls would reach halfway across a narrow strip, such as in a fluxguide or poletip, a very undesirable "hard-axis" state occurs (FIG. 3c), which is very poor for transmitting flux. To reduce the widths of the edge-curling walls and prevent the hard-axis state in narrow strips it is necessary to laminate with many thin magnetic layers and nonmagnetic spacers.

Figure 4A:
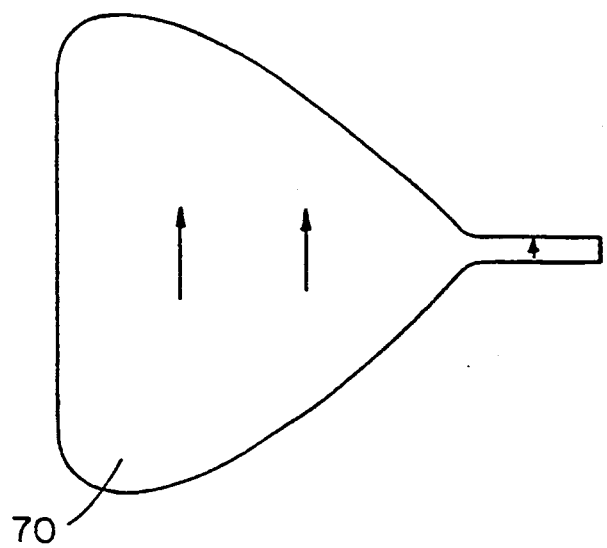
FIG. 4a is a planar schematic diagram of the magnetization pattern for the ideal one domain state in the yoke and poletip regions of a magnetic thin film structure of the present invention.
Figure 4B:
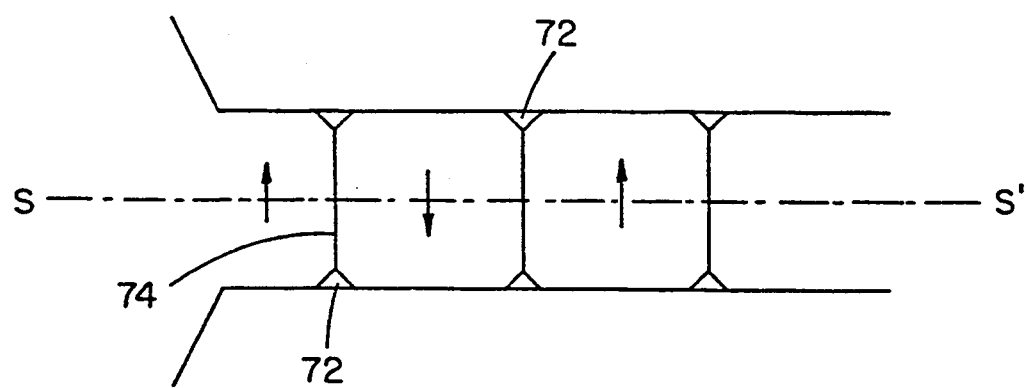
FIG. 4b is a planar schematic diagram of the magnetization pattern of a poletip having less than perfect edge closure.

FIG. 4a shows the magnetization pattern of a yoke and poletip region of a recording head manufactured in accordance with the present invention. FIG. 4a shows that the edge-curling walls and domain walls are completely eliminated, and there is only a single domain 70 present in both the yoke and poletip regions. It should be understood that if less than perfect edge closure is achieved in fabrication, vestigial closure domains 72 and domain wall 74 may result as shown in the poletip of FIG. 4b. Provided the closure is not too poor, the domains 72 will be small leaving a wide channel to conduct flux by magnetization rotation; this would have essentially no effect on the read and write functions of the poletip (or fluxguide) and no significant domain noise would result. In addition, in a completed inductive recording head, the actual length of the poletip is shortened such that only one or two 180° domain walls would be present in the poletip.

Figure 5A:
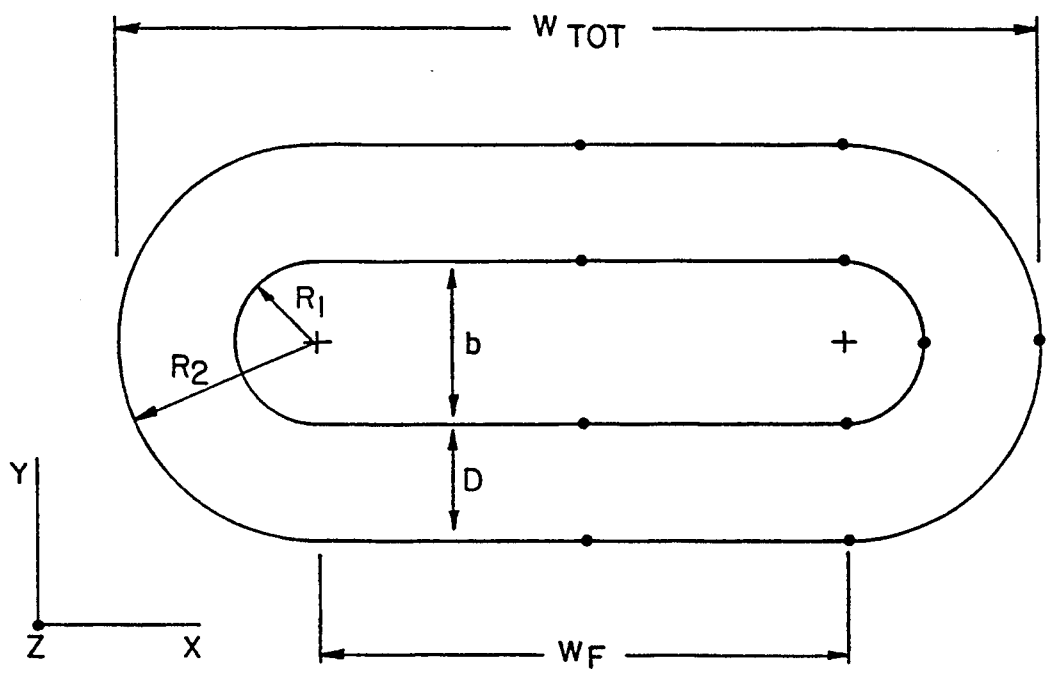
FIG. 5a is a diagram of a mathematical model of the thin film structure of the present invention.

The conditions under which the flux will close through the shorted region, resulting in high permeability, will depend on several factors. FIG. 5a shows in cross-section a mathematical model for a two-magnetic layer structure of the present invention. The structure has a uniform magnetic-film thickness D, so that the inner ($R_1$) and outer ($R_2$) radii of the semicircular edge-films differ by $D = R_2 - R_1$. The actual fabricated geometry will be more nearly rectilinear as shown in FIG. 1a. The curved model is used to simplify the mathematics but it will be understood by those skilled in the art that the basis for the theory may be easily applied to the rectilinear case. The extra material of the sharp-edged "actual" shorting members helps to keep exchange stiffness energy low, which is desirable, by permitting the smooth distribution of M implied by the rounded mathematical model. In addition, FIGS. 5b–5e are schematic drawings of four micromagnetic states. FIG. 5b shows the easy axis state with no leakage; FIG. 5c the easy axis state with partial leakage; FIG. 5d the hard axis state; and FIG. 5e a vestigal closure domain state.

The magnetic energy density contains anisotropy, exchange, stray field and Zeeman terms:

$$w = K\cos^2\theta + A[(\nabla\theta)^2 + (\nabla\phi)^2\sin^2\theta] + H_s/8\pi - HM_s\cos\theta.$$

The polar $\theta$ ($=\cos^{-1} M_z/M_s$) and azimuthal $\phi$ angles for the magnetization vector $\underline{M}$ are conventionally defined. The hard axis of anisotropy is parallel to the z axis. A is the exchange stiffness parameter, K is the uniaxial anisotropy constant and H is the stray field leaking across the nonmagnetic spacer enclosed by the magnetic film, H is the external field having the direction z, and $M_s$ is the spontaneous magnetization. As the two model magnetic regions, flat and curved, may have different anisotropy values, they are distinguished as $K = K_F$ and $K_C$ respectively. Owing to the very large magnitude of stray-field effects, measured by $2\pi M_s^2 \approx 4 \times 10^6$ erg cm$^{-3}$, as compared to anisotropy $K_F \approx 10^3$ erg cm$^{-3}$, the total absence of stray field leakage is assumed provisionally ($H_s = \theta$).

It is assumed as a simplifying assumption that 0 is constant across the thickness of each magnetic film. It then follows from the assumed constancy of film thickness that the flux must circulate around the tube in such a way that $\theta$ is everywhere the same. Integrating w over the sectional area of magnetic material, we have the energy per unit film length $$E = (S_F K_F + S_C K_C)\cos^2\theta + [2\pi A \ln(R_2/R_1)]\sin^2\theta - (S_F + S_C)HM_s\cos\theta \quad (1.2)$$

where $S_F = 2DW_F$ and $S_C = \pi (R_2^2 - R_1^2)$ are the areas of flat and curved regions, respectively. Here $$W_F = W_{tot} - 2R_2 \quad (1.3)$$

is the flat width as distinguished from the total width $W_{tot}$ of the model. The exchange term above follows easily by noting that conformity of $\underline{M}$ to the geometry of the curved region requires $\nabla\phi = \bar{r}^{-1}$, where r is the distance from the arc-central axis of the semicircular boundaries. Integrating w with this substitution over the magnetic film thickness gives the formula (1.2). Minimizing E with respect to $\cos\theta$, we find the magnetization curve $$B(=H + 4\pi M_s\cos\theta) = \mu H, \quad |\mu H| \leq 4\pi M_s, \quad (1.4)$$

where $\mu$ is the initial permeability given by $$\mu = 1 + \frac{2\pi(S_F + S_C)M_s^2}{S_F K_F + S_C K_C - 2\pi A \ln(R_2/R_1)}. \quad (1.5)$$

Note that, for $H = O$, the minimum of E is $\theta = O$ (longitudinal or hard-axis state, FIG. 5d) or $\theta = \pi/2$ (transverse or easy-axis state, FIG. 5b) according to whether $\mu$ is less or greater than 1. This sign is determined by the sign of the denominator in Eq. (1.5), representing the net of anisotropy and exchange effects in the structure as a whole.

For convenience, we define the mean equivalent uniaxial anisotropy field $H_{km}$ which would give the same $\mu$ in the same volume of perfectly flat magnetic film:

$$H_{km} = 4\pi M_s/(\mu - 1) \quad (1.6)$$

Since the logarithm is a weak function, the $\ln(R_2/R_1)$ dependence of exchange energy implies insensitivity to fine details of geometry.

When the spacer is sufficiently thin, one must consider also the possibility of a partial leakage state, (FIG. 5c), in which part of the flux leaks through the nonmagnetic spacer. Analysis shows partial leakage is preferred (has lower energy) over no leakage (FIG. 5b) whenever the following quantity is positive:

$$k = \frac{2\pi A \ln(R_2/R_1) - \pi K_C(R_2^2 - R_1^2)}{4M_s(\pi b D^3 K_F)^{\frac{1}{2}}}$$

The energy of the partial-leakage state is:

$$E = 2M_s(\pi b D^3 K_F)^{\frac{1}{2}}\epsilon + \pi K_C(R_2^2 - R_1^2)$$

where $\epsilon = 2 \tan^{-1} k$.

Finally, a fourth state with vestigial closure domains can occur with incomplete edge closure. Incomplete closure can occur, for example, when the edge closure layers are too thin. An example of this state yields the vestigial edge-closure domains of the poletip of FIG. 4b. FIG. 5e is a diagram of the magnetization pattern of the poletip of FIG. 4b, with four sides of the tip unfolded. Region 75 is the planar surface shown in FIG. 4b. Regions 76 and 77 are the edge-closed sides of the top and Region 78 is the surface opposed to Region 75 cut along the mid-line S–S' of FIG. 4b.

Figure 6:
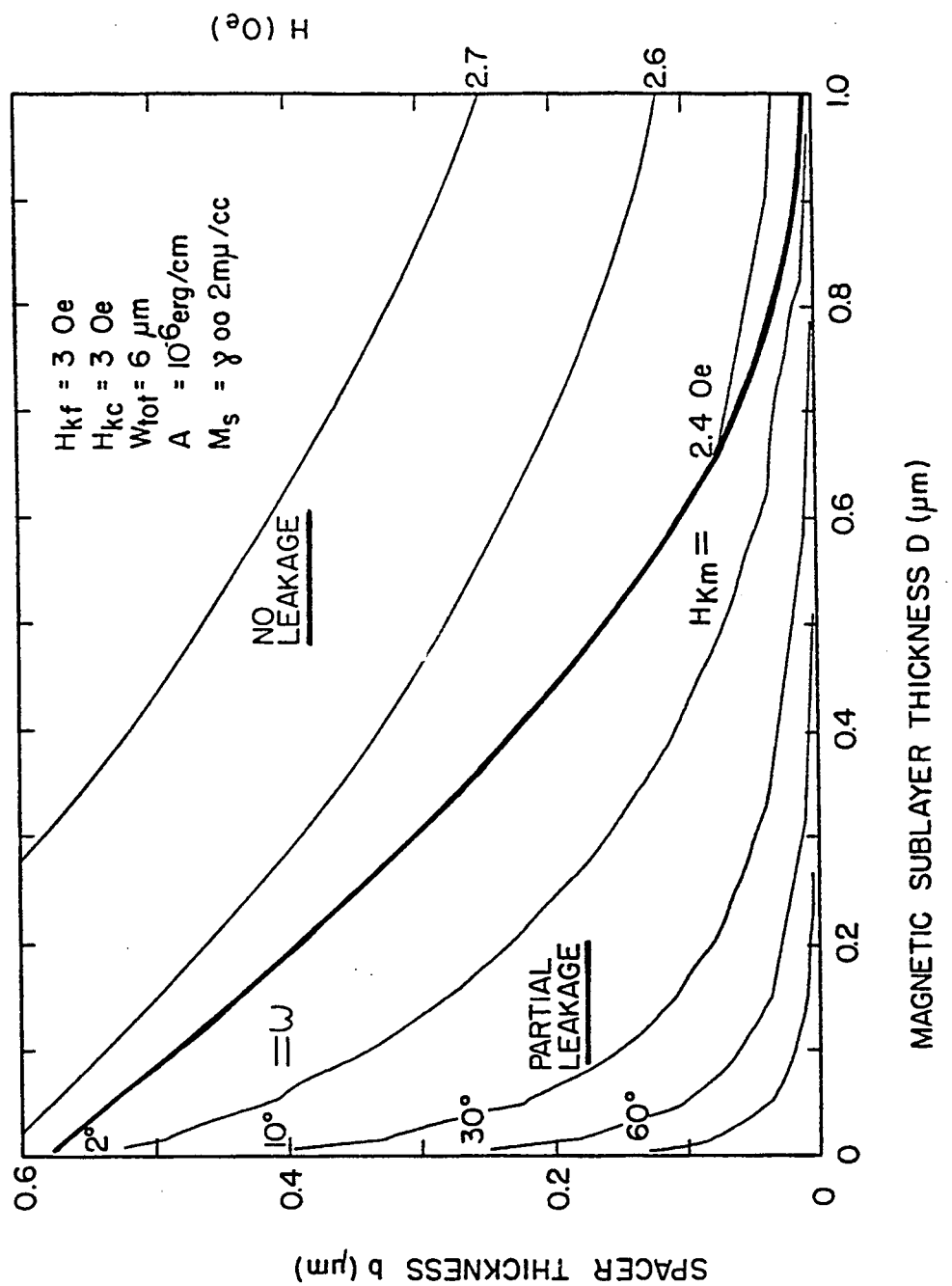
FIG. 6 is a contour plot of the theoretically predicted edge-curling wall angle as a function of the thickness of the magnetic layers and the thickness of the antiferromagnetic material.

FIG. 6 illustrates a phase diagram predicted by the foregoing energy expressions. The wide line is a phase boundary. The narrow lines are contours of $H_{km}$ in the easy-axis "no leakage" phase and the angle $\omega$ of the edge-curling wall in the easy-axis "partial-leakage" phase. The total strip width is $W_{tot} = 6$ $\mu$m, representing a recording poletip or fluxguide. The flat-film anisotropy field $H_{kf} = 3$ Oe is typical of what can be induced in permalloy with a field during deposition. The shorting-film anisotropy field $H_{kc} = 3$ Oe can be induced during deposition, or during subsequent annealing, by the closure flux of the already present flat film; or else by an external field perpendicular to the film plane. The mean anisotropy field $H_{km}$ (Eq. (1.5) and (1.6)) throughout the preferred "no leakage" region of the phase diagram is only a little less than 3 Oe, indicating that stability against magnetostrictive effects would not be greatly diminished. Within a large portion of the partial leakage region, the edge-wall angle $\omega$ is small, indicating that much of this region might produce only slightly more noise than the no-leakage phase. Shorting the laminations tends to favor greater b, permitting the easy avoidance of exchange coupling through pinholes in the spacer. Thus, very narrow poletip regions may be fabricated and exhibit little or no domain noise.

A successful strategy for eliminating, or at least minimizing, the presence of domain walls will depend on what device characteristics are desired and what ranges of material parameters and degrees of control are used.

FIG. 6 indicates that increasing the magnetic sublayer thickness D anywhere within the "partial leakage" region should decrease circuit noise because the wall-angle $\omega$, and therefore the noisy flux capacity of the wall, thereby decreases. However, it may be necessary to limit D to avoid signal loss at high frequency due to eddy current damping. If D had to be as small as 0.2 $\mu$m, for example, there would be a trade-off between the need for small spacer thickness b for the sake of signal strength and large b for the sake of minimizing noise due to irreversible wall switching.

Figure 7A:
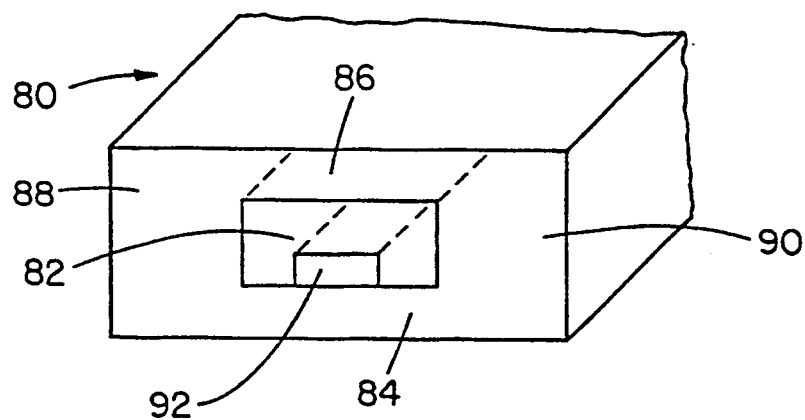
FIG. 7a is a perspective view of a magnetic thin film structure of the present invention including a layer of antiferromagnetic material.
Figure 7B:
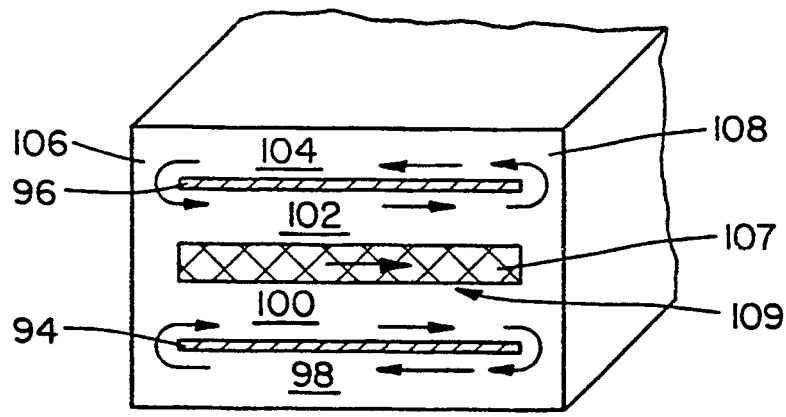
FIGS. 7b and 7c are perspective views of another embodiment of the structure of the present invention including multiple spacer layers and a layer of antiferromagnetic material.

Referring now to FIGS. 7a and 7b, there is shown an embodiment of the thin film magnetic structure of the present invention which includes a layer of antiferromagnetic material. As shown in FIG. 7a, a laminate 80 includes a spacer layer of nonmagnetic material 82 sandwiched between two layers of ferromagnetic material 84 and 86. Edge closure regions 88 and 90 of ferromagnetic material are provided similar to the structure of FIG. 1a. A layer of antiferromagnetic material 92 is disposed within the structure and is in contact with magnetic layer 84 and nonmagnetic spacer layer 82, but is spaced from magnetic layer 86. The advantage of the antiferromagnetic layer will be described below.

FIG. 7b, is a perspective view of an alternative embodiment of a multiple layer structure having two nonmagnetic spacers 94 and 96, each of which are sandwiched between magnetic layers 98, 100 and 102, 104, respectively. Edge closure layers 106 and 108 provide magnetic contact to all the magnetic layers on the side edges. A layer 107 of antiferromagnetic material is disposed between magnetic layers 100 and 102 to provide the additional anisotropy. The air bearing surface 109 is not edge-closed. The magnetic layers in the embodiments of FIGS. 7a and 7b are comprised of a ferromagnetic material.

In the laminate of FIG. 1, the side edge closure regions provide an efficient closure path between lamina, lower in energy than the external fringe field closure normally encountered between laminated films. Additional dimensional flexibility while retaining the desired easy axis state (FIG. 5b) can be obtained by exchange biasing as shown in FIGS. 7a and 7b.

The desired bias of the edge closed lamina can be achieved by placing an oriented antiferromagnetic film in direct contact with one lamina, but out of contact with the other by means of the nonmagnetic spacer, as shown in FIG. 7a. The antiferromagnetic layer 92 exchange biases the first soft ferromagnetic lamina 84 in the horizontal direction. The edge closures 88 and 90 and the second lamina 86 serve as the return magnetic circuit, thus achieving the desired objective of antiparallel magnetization in the two lamina, except at the two edges where the magnetization curls in the direction from one lamina toward the other. The drop off in horizontal magnetization at the two edges is no worse than that which occurs in conventionally laminated films at the edges, and can be better controlled.

Figure 7C:
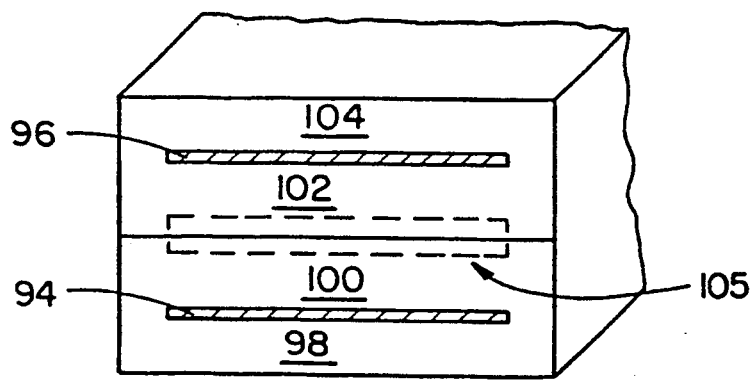

The preferred structure is shown in FIG. 7b. Note, if desired, the antiferromagnetic layer 107 need not extend all the way to the air bearing surface, for example, to reduce sensitivity to corrosion and wear but may be terminated within about 1 micron of the air bearing surface. FIG. 7c shows the air bearing surface 105 of such a structure. The distance that the magnetic layer 107 is recessed is not critical, and it should be pointed out that the nonmagnetic spacers 94 and 96 do extend all of the way to the air bearing surface 105. The reason for this is to ensure the circular magnetization pattern between the two pairs of magnetic layers 98, 100 and 102, 104 extends all the way to the air bearing surface.

The magnetic thin film structures of the present invention are formed by depositing thin film layers on a substrate that may or may not be composed of a single crystal. Any of the conventional materials for the substrate may be used such as ferrites, glass and alumina. The magnetic material is typically a ferromagnetic material which is usually highly permeable and soft such as NiFe. The magnetic layers may also be formed of ferrimagnetic materials, such as MnZn ferrite. Permalloy is a preferred ferromagnetic material utilized for the magnetic layers of the structure, which comprises about 80% nickel and 20% iron. Other ferromagnetic materials may also be used such as supermalloy. Suitable ferrimagnetic materials include MnZn and NiZn ferrites. Any suitable nonmagnetic material (conducting or insulating) may be utilized for the spacers such as NiP, Cu, Cu alloys, Pd, Pd alloys, $Al_2O_3$ or $SiO_2$. The antiferromagnetic material may be a magnesium gamma phase alloy of binary, ternary and higher level alloys with elements selected from the group consisting of Fe, Co, Cu, Ge, Ni, Pt, and Rh, with Mn. Typically, FeMn is utilized for the antiferromagnetic layer.

To accomplish proper flux closure via the edge-closure layers, the laminate can have an even number of identical magnetic layers with edge-closure layers of the same material and thickness. Alternatively, some of the magnetic layers (including the edge-closure layers) may be of different magnetic materials, with thicknesses selected to carry the same magnetic flux in saturation.

The fabrication of the thin film structure of the present invention utilizes processing steps well known in the electronics industry. These steps include conventional etching and masking techniques and deposition techniques. The magnetic, nonmagnetic and antiferromagnetic layers may also be deposited by conventional plating techniques.

Referring now to FIGS. 8a–8e, for one embodiment of fabricating a thin film magnetic structure of the present invention, a substrate 110 is provided and a thin seed layer 112 of NiFe is deposited on the substrate 110. The seed layer 112 is overcoated with a thin plating barrier 114. The plating barrier must inhibit plating of permalloy on the seed layer but must be selectively etched off where plating is desired. Typically, 800 angstroms of $SiO_2$ may be evaporated to form the layer 114. Other possible plating barriers include 200 to 400 angstroms of Ti, Ta, Nb or Si. A conventional photoresist plating frame 116 is deposited on the plating barrier 114. Subsequent thereto, the exposed portion of plating barrier 114 is then chemically etched away. The plating frame 116 as is conventionally known, is deposited in the shape of the structure being fabricated, such that the head will be formed from material deposited inside the frame. After deposition, all magnetic material outside the frame is removed by chemical etching. The drawings used herein to describe the fabrication steps are cross-sectional views.

Figure 8A:
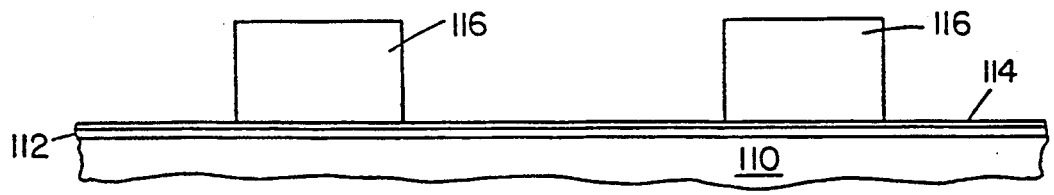
FIGS. 8a–8e are schematic diagrams of the sequence of steps of one method of fabricating a magnetic thin film structure of the present invention.
Figure 8B:
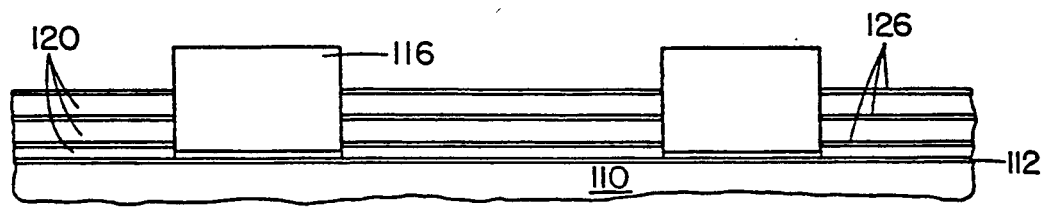

As shown in FIG. 8b, the laminate of alternate magnetic layers and nonmagnetic spacers is plated on the exposed regions of layer 112. As stated above, the laminate may comprise a single nonmagnetic spacer sandwiched between two magnetic layers or may contain a multiplicity of spacers each sandwiched between two magnetic layers with the requirement that there be an "even" number of magnetic layers. The methods and techniques disclosed below with reference to the figures describe the fabrication of a laminate comprising a multiplicity of layers, however, it should be understood that the same techniques will be utilized for a laminate comprised of two magnetic layers and a single nonmagnetic spacer.

As shown in FIG. 8b, intermediate layers 120 of NiFe are alternately plated with layers 126 of NiP. At this stage, the last layer plated must be a nonmagnetic spacer so that the upper layer of the laminate is nonmagnetic material. Non-magnetic spacers are made sufficiently thick to minimize flux leakage as shown in FIG. 6, typically 300 angstroms or greater. This loosens fabrication tolerances and eliminates concern for pinholes. Magnetic layer thickness is determined by performance requirements such as required writing flux and bit resolution. The plating of the magnetic and nonmagnetic layers can be out of separate baths. Alternatively, the magnetic and nonmagnetic layers may be alternately plated out of the same bath by known composition modulation plating techniques, such as that disclosed by L. T. Romankiw, J. T. Olsen, Ext. Abs. Electro. Chem. Soc., Vol. 89, Abs #300, p. 430–31, Fall 1989.

Figure 8C:
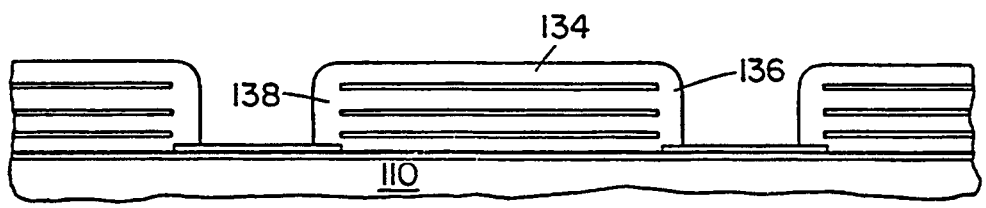

As shown in FIG. 8c, the plating frames are removed by conventional photoresist removal techniques and a top magnetic layer 134 is then plated onto the laminate. As can be seen in FIG. 8c, plating also occurs on the edges of the laminate producing side edge closure layers 136 and 138 of magnetic material. It should be noted that the plating barrier layer 114 which remains after the plating frames are removed, prevents plating of magnetic material onto the seed layer 112. In addition, the thickness of the final layer 134 and side edges 136 and 138 is chosen to equal the sum of the desired NiFe thickness plus the amount that will be lost when sputter etching to remove the seed layer in later steps. The desired final NiFe thickness will usually be the same as (or half as thick as in FIG. 1f) the underlying magnetic layers.

Figure 8D:
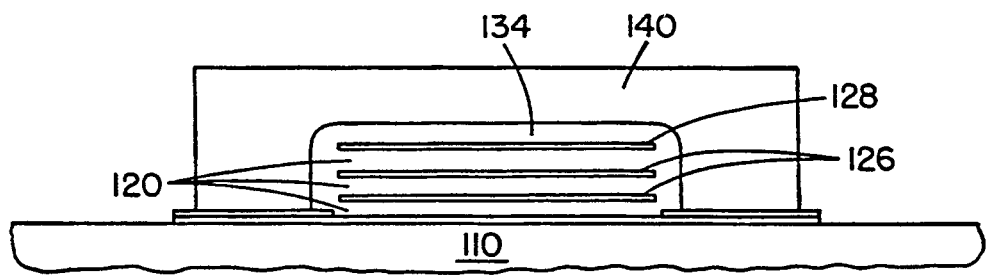
Figure 8E:
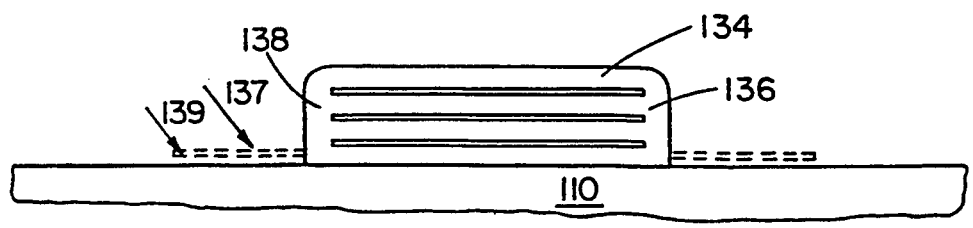

As shown in FIG. 8d, a photoresist cap layer 140 is deposited to protect the entire laminate structure. All the material that was plated outside the plating frame 116 is etched away. The cap 140 is removed and as shown in FIG. 8e, in phantom, the plating barrier and seed layer wings 137 and 139 are removed by reactive ion etching and sputter etching. Typically, an RIE process using $CF_4$ is utilized to etch the $SiO_2$. Since $CF_4$ drastically inhibits the etching of NiFe, no significant permalloy is lost in this step. The system is then operated in the sputter etch mode with Ar to sputter etch away the NiFe seed layer.

Figure 9A:
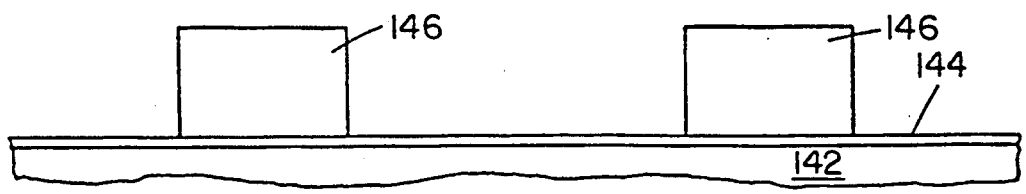
FIGS. 9a–9e are schematic diagrams showing the sequence of steps of a second method of fabricating a magnetic thin film structure of the present invention.
Figure 9B:
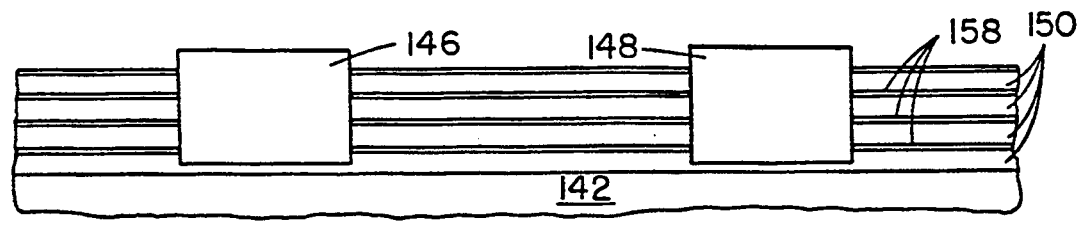
Figure 9C:
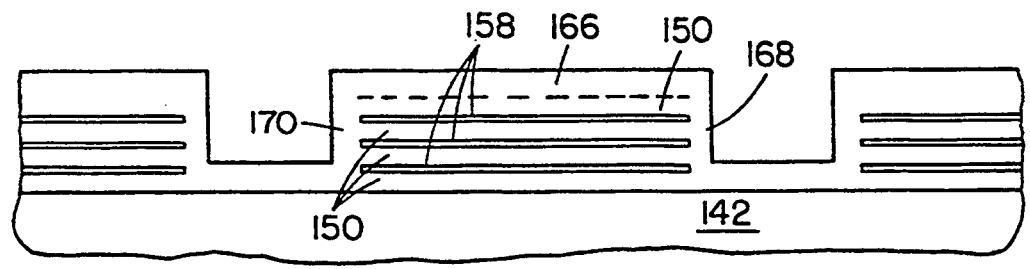
Figure 9D:
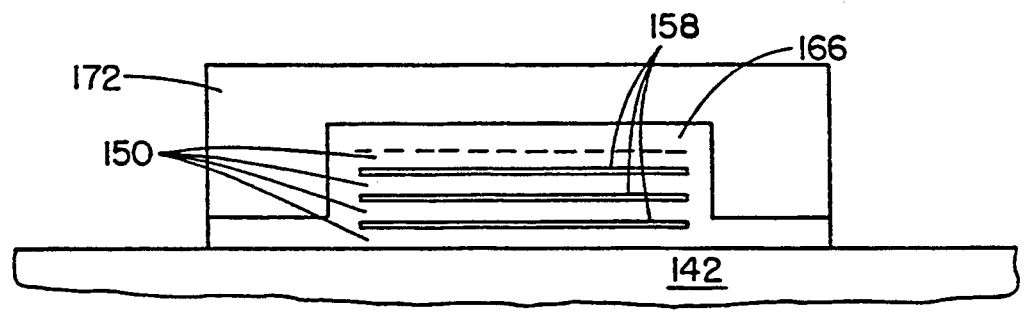
Figure 9E:
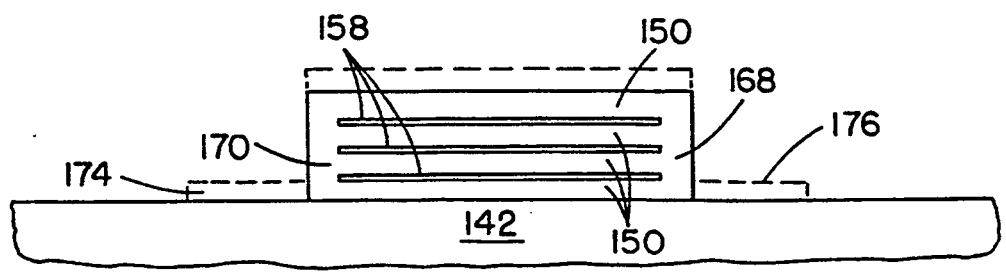

In an alternative method shown in FIGS. 9a–9e, a substrate 142 is provided with a seed layer 144 of NiFe and photoresist frame 146. No plating barrier overlayer is provided in this method. As shown in FIG. 9b, layers 150 of magnetic material are alternately plated with spacers 158 of nonmagnetic material as disclosed above. The plating is stopped when the desired number of layers is reached with the top layer 150 being permalloy of thickness equal to that of the outer magnetic layer and edge-closure layer. The plating frame resist 146 is then removed as shown in FIG. 9c. Additional permalloy layer 166 is then deposited on the top together with side edges 168 and 170 on the laminate. The top layer 166 is plated to a thickness equal to or greater than the other magnetic layers. Protective resist cap 172 is deposited over the laminate and the excess plating material is etched away. The resist cap is removed and the side wings 174, 176 are sputter etched as well as the thickness of layer 166 to provide the edge closed laminate. Since in sputter etching, material is removed rapidly from areas normal to the impinging ions, and either not removed or even redeposited on surfaces parallel to the ion acceleration, the plated edge closure layers 168 and 170 remain intact during sputter etching of the wings.

Figure 10A:
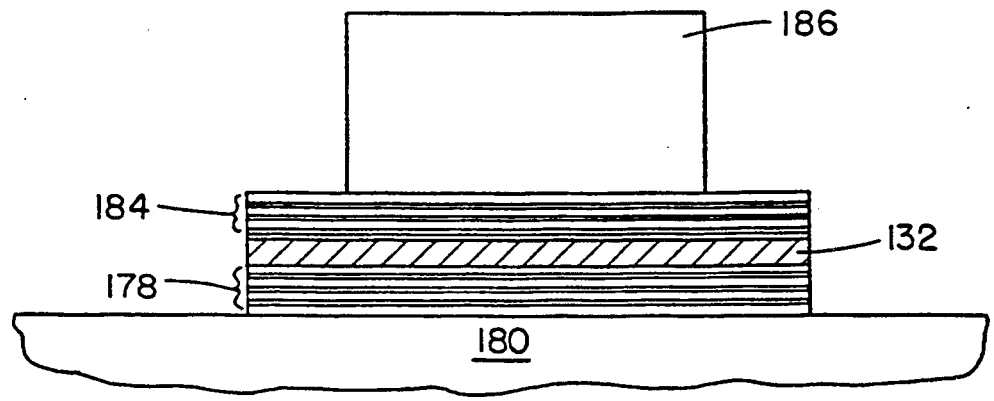
FIGS. 10a–10c are schematic diagrams of the sequence of steps of a third method of fabricating a magnetic thin film structure of the present invention.
Figure 10B:
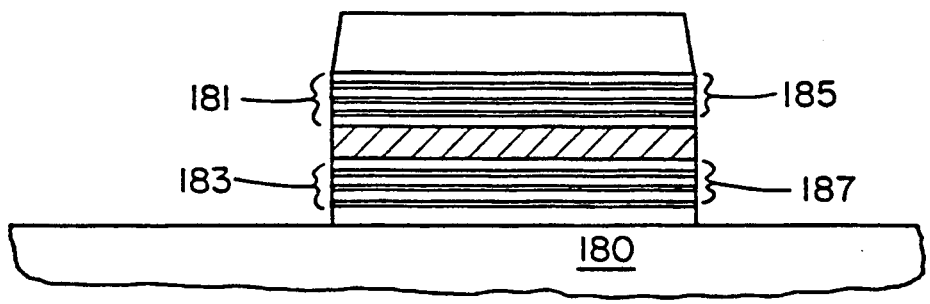
Figure 10C:
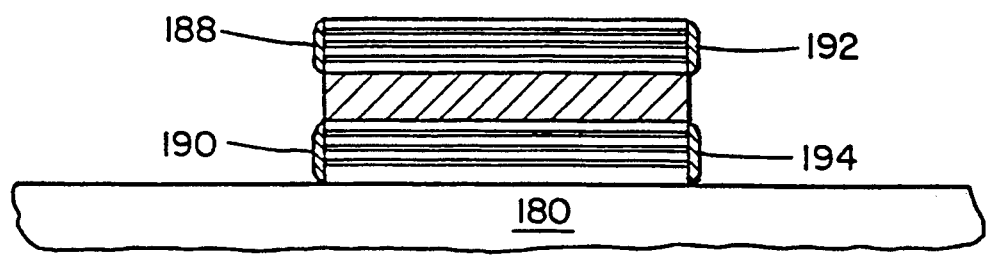

FIGS. 10a–10c, show another embodiment wherein edge closure is provided after the poletip and gap structure is completed. As shown in FIG. 10a, a first laminate 178 is deposited on a substrate 180. An appropriate gap layer 182 is deposited which may comprise $Al_2O_3$ which is non-conductive. A second laminate 184 is deposited thereby forming the two yoke regions and two poletip regions of a complete recording head. A resist 186 is then deposited on top of the laminate 184 at the desired width for the structure. The exposed regions of laminates 178 and 184 and the gap region 182 are removed by conventional trimming or ion milling techniques and the resulting structure is shown in FIG. 10b. After ion milling, but prior to the removal of the resist 186, the exposed ion milled edges 181, 183, 185 and 187 of the laminates 178 and 184 are activated by immersing the structure in a standard palladium chloride activating solution. Subsequently, the structure is immersed in a standard electroless NiFe bath which may preferably contain DMAB as a reducing agent. As shown in FIG. 10c, closure layers 188, 190, 192 and 194 are plated on the laminates 178 and 184 to form the edge closed structures. The immersion time of the electroless bath depends on the NiFe thickness desired on the edges. The thickness should be approximately the same as the outer magnetic layers in the laminates. The resist 186 is removed after the NiFe plating is completed.

In yet another embodiment, shown in FIGS. 11a–11d, the first magnetic layer 196 is deposited on substrate 198 by conventional processes such as evaporation, sputter deposition and ion beam deposition to a thickness of typically 200 to 400 angstroms. Photoresist layer 200 is deposited having window 202 that defines the width of the nonmagnetic layer. A nonmagnetic spacer layer 204 is then deposited through the window 202 by the conventional deposition processes mentioned above. A refractory metal may be suitable for the spacer such as Mo, W, Ta or Ti.

The structure is then heated, typically to 110° C. for ten minutes, to cause overhang regions 206 and 208 of the photoresist masking layer 200 to shrink back thereby widening the window 202 as shown in FIG. 11b. It is known that the edge of the masking layer will retract by 0.5 microns under these conditions when 100–200 angstroms of Mo has been deposited on top of the resist.

Thereafter, a second magnetic layer 210 is deposited on the nonmagnetic spacer 204 also using the same deposition processes described above. The thickness and composition of this layer would typically be the same as that for the first magnetic layer 196, although this is not a requirement of the process. In view of the fact that the masking layer 200 has been heated so that the window 202 is widened, the second magnetic layer 210 extends beyond the edges of the spacer 204 and is in magnetic contact with the first magnetic layer 196. A second masking layer 212 is deposited on layer 210 to serve as a sputter etch mask for patterning the first magnetic layer. The second masking layer 212 may also comprise a refractory metal such as Ti, W, Ta and Mo.

The structure is then immersed in an appropriate organic solvent to remove (lift off) the unwanted metal and the resist masking layer 200 to leave the structure shown in FIG. 11c. Since the sputter etch mask 212 is defined in the same operation as the second magnetic layer 210, there is automatic registration between the two layers. The first magnetic layer 196 is then patterned to coincide with the second magnetic layer 210 by removing the exposed regions of the first layer 196 outside the laminate by sputter or reactive ion etching. The second masking layer 212 is then removed by reactive ion etching. Ti is a suitable material for the etch mask 212 since it etches slowly compared to NiFe in pure Ar or in Ar with five percent $O_2$ but etches very rapidly compared to NiFe in a $CF_4$ plasma.

In FIGS. 12a-c, an alternative embodiment applicable where it is only desirable to provide an edge closure layer on one edge of the laminate is shown. A substrate 214 is provided with the first magnetic seed layer 216; a masking layer 218 having window 220 is deposited identically as described for FIG. 11a. In this embodiment, however, the window 220 defines the width of the final structure. Thereafter, as shown in FIG. 12a, the deposition of the spacer 222 is performed with the structure tilted so that incident material flux depicted by arrows 224 is at an angle to an axis 226 normal to the substrate. As shown in FIG. 12a, the tilt angle results in the spacer 222 being shifted to one side of the window. Deposition of the second magnetic layer 228, is done with normal incidence of deposition 240, as shown in FIG. 12b. This results in the magnetic layer 228 being formed with one side edge closure region 230 in contact with the first magnetic layer 216 but with no edge closure layer on the opposite side of the laminate. The remaining steps of the process are identical to those described in the previous embodiment in which an etch mask layer 232 is deposited with the angle of deposition being parallel to the normal axis as shown in FIG. 12b. The masking layer 218, the excess of seed layer 216 and the masking layer 232 are removed by steps similar to those discussed with FIG. 11 to provide the structure shown in FIG. 12c.

In the fabrication of the structures of FIGS. 7a and 7b, the antiferromagnetic layer need only be on the order of 100–500 angstroms and does not substantially increase the total thickness of the structure. The exchange bias field can be kept at least twice the coercivity if the NiFe layers adjacent to the FeMn are kept less than 3600 angstroms in thickness, assuming the NiFe coercivity is 0.5 Oe. Thus, a structure with four NiFe layers can be effectively exchange biased with one antiferromagnetic FeMn layer as shown in FIG. 7b. Similarly, the nonmagnetic laminating spacer layer need only be thick enough to break exchange coupling between the antiferromagnetic layer and the second NiFe lamina, for a structure like that in FIG. 7a; or between the edge-connected NiFe layers for the structure depicted in FIG. 7b. A thickness of 1,000–3,000 angstroms would be sufficient. It is desirable to make this nonmagnetic layer as nearly free of pinholes as possible, so as not to upset the biasing configuration. As stated earlier, the antiferromagnetic bias layer does not extend all the way to the air bearing surface, because the film, in the case of FeMn, can be subject to corrosion. By choosing to terminate the antiferromagnetic film in this manner, the bias film can be totally encapsulated by the soft NiFe film, so that ambient corrosion will be the same as that of the NiFe.

The antiferromagnetic layer horizontal magnetization orientation can be achieved in several ways: (1) deposit it in the presence of an applied field; (2) deposit it onto a previously oriented soft magnetic layer; (3) deposit it onto a previously oriented soft magnetic layer while an orienting field is also applied; (4) deposit all soft magnetic and antiferromagnetic layers (preferably in an applied orienting field), followed by a setting anneal of the structure at a temperature above or near the Neel temperature of the antiferromagnetic layer and cooling in the presence of an applied orienting field.

The attributes of the preferred structure consist of antiferromagnetically biased, adjacent NiFe layers, with separated edge-connected NiFe layers to provide the return flux paths. The thicknesses of the basic layers of NiFe are preferably equal for reasons of flux-closure. The FeMn layers do not extend to the edges of the NiFe films, nor does it extend to the ABS. The nonmagnetic layers do not extend to the edges of the NiFe, except at the ABS, where it is preferable to extend the nonmagnetic material all of the way to the ABS. The resultant structure, with its easy-axis alignment in the trackwidth direction, will have optimum rotational permeability for detecting media flux during readback. The domain state is stable and is determined by the antiferromagnetic biasing film, and as such, the structure will have low noise due to unwanted or extra domain wall movement. This structure provides a "built-in" easy axis, and so it avoids one of the potential pitfalls of simple lamination. Recording heads can be made with trackwidths in the range of a few micrometers, narrower than the current state-of-the-art.

While the invention has been particularly shown and described with respect to preferred embodiments thereof, it would be understood by those skilled in the art that the foregoing of the changes in form and details may be made therein without departing from the spirit and scope of the invention which should be limited only by the scope of the appended claims.

Having thus described the invention, what is claimed as new and what is desired to be secured by Letters Patent is:

1. A method of fabricating a magnetic thin film structure comprising the steps of:
   depositing a first layer of magnetic material on a substrate;
   depositing a barrier layer on said first layer of magnetic material;
   forming a frame on said barrier layer and removing exposed regions of said barrier layer thereby exposing said first layer of magnetic material;
   forming a laminate of alternate layers of at least one intermediate layer of magnetic material and at least one layer of nonmagnetic material on said first layer of magnetic material, one layer of said at least one layer of nonmagnetic material being an upper layer of said laminate;
   removing said frame; and depositing a top layer of magnetic material on said upper layer and at least a first edge closure layer of magnetic material on a first side edge of said laminate, said first edge closure layer being in magnetic contact with each of said at least one intermediate layer and said top layer of magnetic material.

2. The method of claim 1 wherein first and second edge closure layers of magnetic material are deposited on opposed side edges of said laminate, both said first and said second edge closure layers being in magnetic contact with said at least one intermediate layer and said top layer of magnetic material.

3. The method of claim 1 further including the steps of depositing a protective cap surrounding said laminate and removing all material on said substrate outside said cap.

4. The method of claim 1 wherein said laminate is formed by alternately plating said magnetic and nonmagnetic layers out of separate baths.

5. The method of claim 1 wherein said laminate is formed by alternately plating said magnetic and nonmagnetic layers out of the same bath.

6. The method of claim 5 wherein said plating of said magnetic and nonmagnetic layers out of the same bath includes modulating the current density of the bath to selectively deposit said magnetic and nonmagnetic material.

7. The method of claim 1 wherein said barrier layer comprises an insulator.

8. The method of claim 7 wherein said insulator is $SiO_2$.

9. The method of claim 1 wherein said barrier layer comprises a conductor.

10. The method of claim 9 wherein said conductor is Ti.

11. The method of claim 1 wherein said barrier layer comprises a semiconductor.

12. The method of claim 11 wherein said semiconductor is Si.

13. A method of fabricating a magnetic thin film structure comprising the steps of:
   depositing a first layer of magnetic material on a substrate;
   forming a frame on said first layer of magnetic material;
   forming a laminate of alternate layers of magnetic material and nonmagnetic material, said laminate including at least one layer of nonmagnetic material and at least two layers of magnetic material, one layer of said at least two layers of magnetic material being an upper layer of said laminate;
   removing said frame; and
   depositing a top layer of magnetic material on said upper layer and at least a first edge closure layer of magnetic material on a first side edge of said laminate, said first edge closure layer being in magnetic contact with each of said at least two layers of magnetic material and said top layer of magnetic material.

14. The method of claim 13 wherein first and second edge closure layers of magnetic material are deposited on opposed side edges of said laminate, both of said first and second edge closure layers being in magnetic contact with said at least two layers of magnetic material and said top layer of magnetic material.

15. The method of claim 13 further including the steps of:
   depositing a protective cap surrounding said laminate;
   removing all material on said substrate outside said cap;
   removing said cap; and
   simultaneously removing magnetic material oustide said laminate and said top magnetic layer.

16. The method of claim 13 wherein said laminate is formed by alternately plating said magnetic and nonmagnetic layers out of separate baths.

17. The method of claim 13 wherein said laminate is formed by alternately plating said magnetic and nonmagnetic layers out of the same bath.

18. The method of claim 17 wherein said plating of said magnetic and nonmagnetic layers out of the same bath includes modulating the current density of the bath to selectively deposit said magnetic and nonmagnetic material.

19. A method of fabricating a magnetic thin film structure comprising the steps of:
   forming a seed layer of magnetic material on a substrate;
   electroplating a laminate of alternate layers of magnetic material and nonmagnetic material on said seed layer, said laminate including at least one layer of nonmagnetic material and at least two layers of magnetic material, one layer of said at least two layers of magnetic material being a top layer of said laminate;
   electroplating a first edge closure layer of magnetic material on a first side edge of said laminate, said first edge closure layer being in magnetic contact with each of said at least two layers of magnetic material and;
   removing said seed layer from said substrate.

20. The method of claim 19 further including depositing a second edge closure layer of magnetic material on a second side edge of said laminate opposed to said first side edge prior to removal of the seed layer, said second edge closure layer being in magnetic contact with each of said at least two layers of magnetic material.

21. The method of claim 20 wherein the step of forming a laminate further includes trimming opposed side edges of said laminate to reduce the width of said laminate to a predetermined value, said trimmed edges forming said first and second side edges.

22. The method of claim 21 wherein the step of depositing the first and second edge closure layers includes exposing said first and second side edges to an activating solution and subsequently plating the first and second side edges with magnetic material.

23. The method of claim 22 wherein the plating step includes immersing the laminate in an electroless bath system.

24. A method of fabricating a magnetic thin film structure comprising the steps of:
   depositing a first layer of magnetic material on a substrate;
   depositing a first masking layer having a window on said first layer of magnetic material;
   depositing a layer of nonmagnetic material on said first layer through said window;
   widening the window of said first masking layer;
   depositing a second layer of magnetic material on said layer of nonmagnetic material through said widened window, said second layer extending over opposed side edges of said layer of nonmagnetic material and magnetically contacting said first layer of magnetic material;

depositing a second masking layer on said second layer of magnetic material; and removing said first masking layer, said first layer of magnetic material surrounding said second masking layer and said second masking layer.

25. The method of claim 24 wherein the step of depositing a first masking layer includes depositing a photoresist.

26. The method of claim 25 wherein the step of widening the window of the first masking layer includes heating the photoresist thereby causing opposed edges of the window to shrink back.

27. The method of claim 26 wherein the step of depositing a second masking layer includes depositing a thin film of a refractory metal.

28. The method of claim 27 wherein said refractory metal is selected from the group consisting of Ti, Mo, Ta and W.

29. A method of fabricating a magnetic thin film structure comprising the steps of:

depositing a first layer of magnetic material on a substrate;

depositing a first masking layer having a window of a first width on said first layer of magnetic material;

depositing a layer of nonmagnetic material on said first layer through said window;

removing the first masking layer and depositing a second masking layer having a window of a second width greater than said first width on said first layer;

depositing a second layer of magnetic material on said layer of nonmagnetic material through the window in said second masking layer, said second magnetic layer extending over opposed side edges of said layer of nonmagnetic material and magnetically contacting said first layer of magnetic material;

depositing a third masking layer on said second layer of magnetic material; and removing said second masking layer, removing said first layer of magnetic material surrounding said second masking layer and removing said second masking layer.

30. The method of claim 29 wherein the step of depositing the first and second masking layer includes depositing a photoresist.

31. The method of claim 30 wherein the step of depositing a third masking layer includes depositing a thin film of a refractory metal.

32. The method of claim 31 wherein said refractory metal is selected from the group consisting of Ti, Mo, Ta and W.

33. A method of fabricating a magnetic thin film structure comprising the steps of:

depositing a first layer of magnetic material on a substrate;

depositing a first masking layer having a window on said first layer of magnetic material;

depositing a layer of nonmagnetic material on said first layer through said window;

depositing a second layer of magnetic material on said layer of nonmagnetic material through said window, said second magnetic layer extending over one side edge of said layer of nonmagnetic material and magnetically contacting said first layer of magnetic material;

depositing a second masking layer on said second layer of magnetic material; and removing said first masking layer, removing said first layer of magnetic material surrounding said second masking layer and removing said second masking layer.

34. The method of claim 33 wherein the step of depositing the layer of nonmagnetic material includes placing the substrate assembly in a deposition system wherein the direction of deposition is at an angle with respect to an axis normal to the substrate.

35. The method of claim 34 wherein the step of depositing a first masking layer includes depositing a photoresist.

36. The method of claim 35 wherein the step of depositing a second masking layer includes depositing a thin film of a refractory metal.

37. The method of claim 36 wherein said refractory metal is selected from the group consisting of Ti, Mo, Ta and W.

38. The method of claim 23 when said electroless bath contains Ni and Fe.

* * * * *